(12) United States Patent
Spurgin et al.

(10) Patent No.: US 8,447,694 B2
(45) Date of Patent: May 21, 2013

(54) COMMODITY FUTURES INDEX AND METHODS AND SYSTEMS OF TRADING IN FUTURES CONTRACTS THAT MINIMIZE TURNOVER AND TRANSACTIONS COSTS

(75) Inventors: Richard B. Spurgin, Amherst, MA (US); Thomas R. Schneeweis, Amherst, MA (US); Hossein B. Kazemi, Florence, MA (US); George A. Martin, Florence, MA (US)

(73) Assignee: Altenative Investment Analytics LLC, Amherst, MA (US)

( * ) Notice: Subject to any disclaimer, the term of this patent is extended or adjusted under 35 U.S.C. 154(b) by 14 days.

(21) Appl. No.: 12/613,356

(22) Filed: Nov. 5, 2009

(65) Prior Publication Data

US 2010/0121755 A1    May 13, 2010

Related U.S. Application Data

(62) Division of application No. 11/385,624, filed on Mar. 21, 2006, now abandoned.

(60) Provisional application No. 60/663,648, filed on Mar. 21, 2005.

(51) Int. Cl.
*G06Q 40/00*    (2006.01)

(52) U.S. Cl.
USPC ............. 705/44; 705/36 R; 705/37; 705/35; 705/39

(58) Field of Classification Search ............ 705/44
See application file for complete search history.

(56) References Cited

U.S. PATENT DOCUMENTS

| | | | | |
|---|---|---|---|---|
| 5,799,287 | A | * | 8/1998 | Dembo .................. 705/36 R |
| 6,321,212 | B1 | * | 11/2001 | Lange .................. 705/36 R |
| 2003/0126069 | A1 | * | 7/2003 | Cha .................... 705/37 |

OTHER PUBLICATIONS

"Cash it up (cash index confirmation of signals in futures trading)", Michael A. Mermer, Cedar Falls, Iowa, May 1999, ISSN: 0746-2468.*
*European Patent Office Communication* pursuant to Article 94(3) EPC, re: Application No. 06 739 078.1-1238, JL54380.EPP, dated Dec. 7, 2010.
Anson, Mark J.P., Spot Returns, Roll Yield, and Diversification with Commodity Futures, The Journal of Alternative Investments, Dec. 1998, pp. 16-32.
Becker, Kent, "Indexed Commodity Futures and the Risk and Return of Institutional Portfolios," Social Science Research Network, Last Revised Oct. 21, 2000, 1 page.
Fama et al., "Business Cycles and the Behavior of Metals Prices," The Journal of Finance, vol. 43, No. 5, Dec. 1988, 23 pages.
Greer, Robert J., "Conservative Commodities: A Key Inflation Hedge," The Journal of Portfolio Management, Summer 1978, vol. 4, No. 4, 4 pages.

(Continued)

*Primary Examiner* — Hai Tran
(74) *Attorney, Agent, or Firm* — Kilpatrick Townsend & Stockton LLP

(57) ABSTRACT

This invention relates to methods and systems for reducing transaction costs and minimizes turnover in the trading of futures contracts. The invention further describes an algorithm whose output is a unique method of investing in futures contracts that reduces the rate of turnover, and thus the cost of trading, of certain common trading strategies. The primary application of this method is to a class of strategies referred to as indexing strategies that incorporate a dynamic asset allocation approach using futures contracts.

28 Claims, 24 Drawing Sheets

OTHER PUBLICATIONS

Greer, Robert J., "Methods for Institutional Investment in Commodity Futures," The Journal of Derivatives, Winter 1994, pp. 28-36.
Halpern et al., "The Performance of Energy and Non-Energy Based Commodity Investment Vehicles in Periods of Inflation," The Journal of Alternative Investments, Summer 1998, pp. 75-81.
Schneeweis et al., "Comparisons of Commodity and Managed Futures Benchmark Indices," The Journal of Derivatives, CISDM Working Papers Series, Revised Aug. 2, 1996, 25 pages.
Spurgin, Richard, "A Benchmark for Commodity Trading Advisor Performance," The Journal of Alternative Investments, CISDM Working Paper Series, Current Version Apr. 1, 1999, 16 pages.
Strongin et al., "Commodity Investing: Long-Run Returns and the Function of Passive Capital," Derivatives Quarterly, Fall 1995, 10 pages.
PCT Notification of Transmittal of the International Search Report and the Written Opinion of the International Searching Authority, or the Declaration mailed Aug. 9, 2007 regarding International Application No. PCT/US 06/10146 filed Mar. 21, 2006 (9 pages).

* cited by examiner

Hypothetical Performance Statistics

| | NCCI | | | Long Only | | Target Allocation | | | | NCCI vs. Long Only | | |
|---|---|---|---|---|---|---|---|---|---|---|---|---|
| NCCI Composite | NCCI Return | Annual StDev (%) | Average Allocation (%) | Turnover (Round Turns) | Long Only Return | Annual StDev (%) | Target Allocation Return | Annual StDev (%) | Average Allocation (%) | Turnover (Round Turns) | Return Difference (%) | Volatility Reduction (%) | Turnover Reduction (%) |
| 1991 | (3.5) | 12.0 | 68 | 6.2 | (10.8) | 19.0 | (5.5) | 12.9 | 69 | 8.5 | 7.3 | 63 | 69 |
| 1992 | 8.2 | 6.9 | 70 | 6.4 | 7.2 | 9.4 | 7.6 | 6.8 | 71 | 8.2 | 1.0 | 73 | 72 |
| 1993 | (3.4) | 6.0 | 66 | 5.9 | (10.0) | 9.9 | (3.4) | 5.8 | 65 | 8.0 | 6.6 | 60 | 65 |
| 1994 | 14.7 | 9.1 | 71 | 6.4 | 15.7 | 12.4 | 14.0 | 9.0 | 71 | 8.7 | (1.1) | 74 | 71 |
| 1994 | 16.0 | 6.8 | 76 | 6.8 | 17.1 | 8.9 | 16.2 | 6.8 | 76 | 8.9 | (1.0) | 77 | 76 |
| 1996 | 32.8 | 13.1 | 80 | 7.3 | 38.4 | 14.7 | 31.6 | 12.9 | 79 | 9.4 | (5.6) | 90 | 81 |
| 1997 | (3.9) | 9.6 | 67 | 6.1 | (7.7) | 12.7 | (0.8) | 9.5 | 67 | 7.9 | 3.8 | 75 | 67 |
| 1998 | (17.6) | 8.9 | 55 | 4.9 | (31.3) | 17.1 | (17.1) | 9.0 | 55 | 7.0 | 13.7 | 52 | 55 |
| 1999 | 28.7 | 12.8 | 73 | 6.9 | 34.7 | 16.0 | 29.9 | 13.1 | 74 | 8.8 | (6.1) | 80 | 77 |
| 2000 | 32.3 | 13.9 | 77 | 7.1 | 37.9 | 16.4 | 34.5 | 13.8 | 77 | 9.0 | (5.6) | 85 | 79 |
| 2001 | (18.3) | 12.0 | 59 | 5.3 | (28.0) | 17.1 | (17.6) | 11.2 | 60 | 7.9 | 9.7 | 70 | 59 |
| 2002 | 21.0 | 12.0 | 76 | 7.0 | 29.9 | 14.5 | 22.8 | 11.7 | 76 | 9.2 | (8.9) | 83 | 78 |
| 2003 | 17.6 | 14.0 | 78 | 6.8 | 27.5 | 16.9 | 20.3 | 13.8 | 78 | 8.6 | (9.8) | 83 | 76 |
| 2004 | 18.0 | 15.4 | 78 | 7.1 | 18.6 | 19.0 | 10.4 | 15.1 | 77 | 9.4 | (0.6) | 81 | 79 |
| Average Annual | 10.2 | 10.9 | 71 | 6.4 | 10.0 | 14.6 | 10.6 | 10.8 | 71 | 8.6 | 0.2 | 75 | 72 |
| Compound Annual | 8.9 | | | | 7.3 | | 9.3 | | | | 1.6 | | |

FIG. 2

CATTLE (CME)

FIG. 4

| | NCCI Return | NCCI Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | Turnover Ratio (%) |
|---|---|---|---|---|---|---|---|---|---|---|---|---|---|
| 1991 | 2.7 | 6.8 | 72 | 4.2 | 3.1 | 9.5 | (1.7) | 5.8 | 69 | 6.7 | (0.4) | 71 | 70 |
| 1992 | 23.8 | 7.4 | 92 | 5.4 | 29.1 | 8.1 | 19.2 | 7.4 | 91 | 7.9 | (5.3) | 90 | 90 |
| 1993 | 7.8 | 7.0 | 77 | 4.7 | 8.1 | 8.5 | 0.6 | 6.3 | 75 | 8.7 | (0.3) | 82 | 79 |
| 1994 | 3.9 | 7.9 | 67 | 3.9 | 2.6 | 12.2 | (2.3) | 7.7 | 68 | 9.0 | 1.3 | 65 | 65 |
| 1995 | 7.7 | 8.3 | 61 | 4.6 | 6.6 | 11.0 | (0.4) | 7.9 | 79 | 7.7 | 1.0 | 76 | 77 |
| 1996 | 8.2 | 8.7 | 72 | 4.2 | 11.8 | 12.9 | 4.8 | 7.9 | 71 | 7.6 | (3.6) | 68 | 69 |
| 1997 | 1.7 | 7.6 | 74 | 4.2 | (0.9) | 9.8 | (4.6) | 7.1 | 72 | 8.3 | 2.6 | 78 | 70 |
| 1998 | (7.0) | 7.8 | 56 | 3.5 | (12.2) | 14.0 | (9.6) | 7.5 | 57 | 4.3 | 5.2 | 56 | 58 |
| 1999 | 10.7 | 9.3 | 82 | 4.6 | 16.5 | 11.1 | 6.3 | 8.6 | 78 | 8.7 | (5.8) | 84 | 78 |
| 2000 | 11.2 | 6.0 | 66 | 3.7 | 9.8 | 8.1 | 5.4 | 6.0 | 68 | 8.3 | 1.4 | 74 | 61 |
| 2001 | (3.2) | 7.2 | 65 | 3.9 | (5.7) | 12.2 | (7.2) | 7.1 | 65 | 9.1 | 2.5 | 59 | 64 |
| 2002 | 9.2 | 8.8 | 79 | 4.7 | 7.1 | 13.1 | 8.0 | 9.0 | 80 | 7.5 | 2.1 | 67 | 78 |
| 2003 | 17.4 | 15.6 | 87 | 4.9 | 17.7 | 17.3 | 18.7 | 15.3 | 85 | 8.2 | (0.3) | 90 | 82 |
| 2004 | 20.0 | 13.2 | 73 | 4.4 | 28.3 | 16.9 | 19.4 | 12.8 | 74 | 8.3 | (8.3) | 78 | 74 |
| Average Annual | 8.2 | 8.7 | 75 | 4.3 | 8.7 | 11.8 | 4.0 | 8.3 | 74 | 7.9 | (0.6) | 74 | 72 |
| Compound Annual | 7.8 | | | | 0.1 | | 3.6 | | | | (0.3) | | |

COFFEE (CSCE)

| | NCCI Return | NCCI Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | Turnover Ratio (%) |
|---|---|---|---|---|---|---|---|---|---|---|---|---|---|
| 1991 | (12.1) | 11.8 | 53 | 2.6 | (20.6) | 20.3 | (12.6) | 13.5 | 55 | 5.3 | 8.6 | 58 | 51 |
| 1992 | 4.2 | 17.9 | 56 | 3.1 | (12.9) | 29.1 | 7.2 | 19.0 | 60 | 4.8 | 17.1 | 62 | 61 |
| 1993 | (13.7) | 29.5 | 71 | 3.4 | (20.7) | 39.7 | (16.3) | 27.5 | 67 | 8.1 | 7.0 | 74 | 68 |
| 1994 | 148.2 | 39.4 | 79 | 4.0 | 143.8 | 43.7 | 156.2 | 38.2 | 76 | 5.6 | 4.4 | 90 | 80 |
| 1995 | (29.1) | 19.2 | 56 | 2.8 | (41.1) | 34.3 | (25.3) | 19.8 | 59 | 5.8 | 11.9 | 56 | 50 |
| 1996 | 19.7 | 22.7 | 72 | 3.7 | 47.4 | 32.2 | 22.5 | 24.2 | 76 | 6.8 | (27.7) | 71 | 73 |
| 1997 | 95.9 | 47.5 | 82 | 3.9 | 118.2 | 53.3 | 113.2 | 46.4 | 82 | 5.2 | (22.3) | 89 | 78 |
| 1998 | (8.1) | 20.8 | 62 | 3.1 | (13.9) | 32.1 | (8.0) | 20.7 | 63 | 5.9 | 5.8 | 65 | 62 |
| 1999 | (2.9) | 36.7 | 62 | 3.3 | 3.2 | 52.6 | (3.4) | 42.3 | 63 | 6.8 | (6.1) | 70 | 66 |
| 2000 | (30.8) | 21.8 | 46 | 2.2 | (53.6) | 43.4 | (35.3) | 28.4 | 48 | 5.5 | 22.8 | 50 | 44 |
| 2001 | (24.3) | 16.4 | 47 | 2.6 | (43.3) | 34.0 | (28.9) | 18.2 | 49 | 4.7 | 18.9 | 48 | 51 |
| 2002 | (5.6) | 27.0 | 66 | 3.5 | 4.7 | 37.3 | 2.1 | 30.6 | 70 | 5.2 | (10.2) | 72 | 70 |
| 2003 | (12.4) | 18.2 | 58 | 2.9 | (10.1) | 29.3 | (17.7) | 20.6 | 60 | 9.0 | (2.2) | 62 | 59 |
| 2004 | 21.4 | 27.0 | 73 | 3.8 | 38.0 | 34.7 | 26.1 | 30.6 | 75 | 6.4 | (16.6) | 78 | 76 |
| Average Annual | 10.7 | 25.4 | 63 | 3.2 | 9.9 | 36.9 | 12.8 | 27.1 | 65 | 6.1 | 0.8 | 68 | 64 |
| Compound Annual | 3.1 | | | | (1.9) | | 3.9 | | | | 4.9 | | |

FIG. 5

COPPER (COMEX)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | Turnover Ratio (%) |
|---|---|---|---|---|---|---|---|---|---|---|---|---|---|
| 1991 | 6.6 | 12.2 | 69 | 4.5 | (8.6) | 16.6 | (6.9) | 12.3 | 69 | 7.9 | 2.0 | 73 | 74 |
| 1992 | 12.1 | 9.6 | 70 | 4.2 | 9.5 | 13.3 | 14.4 | 9.5 | 70 | 5.8 | 2.6 | 72 | 70 |
| 1993 | (9.4) | 13.8 | 64 | 3.9 | (18.6) | 21.1 | (8.8) | 14.3 | 62 | 6.1 | 9.2 | 65 | 65 |
| 1994 | 64.7 | 20.1 | 92 | 5.3 | 78.7 | 21.3 | 68.4 | 19.9 | 91 | 7.6 | (14.0) | 94 | 89 |
| 1995 | (3.0) | 14.9 | 72 | 4.4 | (0.0) | 20.1 | 1.4 | 13.8 | 69 | 8.4 | (3.0) | 74 | 73 |
| 1996 | (1.4) | 21.7 | 68 | 4.1 | (7.3) | 30.5 | (1.9) | 21.4 | 69 | 8.1 | 5.9 | 71 | 68 |
| 1997 | (2.8) | 16.7 | 68 | 4.1 | (14.4) | 22.9 | (1.1) | 15.7 | 67 | 6.3 | 11.7 | 73 | 67 |
| 1998 | (10.7) | 14.5 | 57 | 3.2 | (11.6) | 23.0 | (12.9) | 15.1 | 60 | 7.5 | 0.9 | 63 | 54 |
| 1999 | 16.6 | 18.0 | 71 | 4.4 | 30.3 | 24.1 | 16.4 | 19.2 | 73 | 8.2 | (13.7) | 75 | 74 |
| 2000 | (0.4) | 13.2 | 73 | 4.2 | 2.0 | 17.7 | 1.2 | 13.2 | 72 | 6.0 | (2.5) | 75 | 70 |
| 2001 | (12.7) | 9.5 | 49 | 3.0 | (21.0) | 18.3 | (13.5) | 10.5 | 53 | 5.9 | 8.3 | 52 | 50 |
| 2002 | 2.5 | 14.2 | 74 | 4.3 | 5.9 | 18.0 | 4.6 | 14.1 | 75 | 8.2 | (3.4) | 79 | 71 |
| 2003 | 38.5 | 17.7 | 85 | 4.9 | 48.3 | 20.1 | 34.6 | 17.1 | 85 | 6.8 | (9.8) | 86 | 82 |
| 2004 | 32.8 | 26.5 | 83 | 4.6 | 44.6 | 31.0 | 31.0 | 26.5 | 81 | 8.9 | (11.8) | 86 | 77 |
| Average Annual | 8.6 | 15.9 | 71 | 4.2 | 9.9 | 21.3 | 9.1 | 15.9 | 71 | 7.3 | (1.3) | 74 | 70 |
| Compound Annual | 6.7 | | | | 6.6 | | 7.2 | | | | 0.1 | | |

CORN (CBOT)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | Turnover Ratio (%) |
|---|---|---|---|---|---|---|---|---|---|---|---|---|---|
| 1991 | 5.5 | 14.2 | 68 | 4.4 | (5.8) | 19.9 | 3.7 | 13.8 | 67 | 6.3 | 11.3 | 72 | 62 |
| 1992 | (2.9) | 13.2 | 65 | 4.4 | (3.6) | 20.6 | (3.3) | 13.4 | 66 | 7.7 | 0.7 | 64 | 63 |
| 1993 | 8.5 | 14.1 | 72 | 4.5 | 9.6 | 18.5 | 2.5 | 13.5 | 71 | 7.0 | (1.0) | 76 | 65 |
| 1994 | 39.9 | 15.6 | 80 | 5.6 | 43.8 | 19.3 | 36.4 | 15.8 | 81 | 8.7 | (3.9) | 81 | 80 |
| 1995 | 22.6 | 22.2 | 84 | 5.6 | 35.1 | 25.8 | 17.5 | 22.4 | 82 | 7.6 | (12.5) | 86 | 80 |
| 1996 | (3.1) | 12.8 | 64 | 4.5 | (4.7) | 19.0 | (3.9) | 13.7 | 64 | 10.3 | 1.6 | 68 | 64 |
| 1997 | (7.2) | 7.1 | 51 | 4.0 | (14.6) | 12.2 | (10.2) | 7.0 | 52 | 7.2 | 7.5 | 58 | 57 |
| 1998 | (4.3) | 14.4 | 63 | 4.6 | (10.3) | 19.6 | (6.6) | 14.1 | 63 | 7.4 | 6.0 | 73 | 66 |
| 1999 | (10.4) | 11.7 | 55 | 3.8 | (18.6) | 20.5 | (12.5) | 11.6 | 55 | 7.6 | 8.2 | 57 | 55 |
| 2000 | 2.2 | 16.8 | 73 | 5.4 | 10.0 | 22.8 | 5.9 | 17.3 | 72 | 7.6 | (7.8) | 74 | 77 |
| 2001 | (26.2) | 14.0 | 45 | 3.3 | (54.0) | 27.4 | (26.9) | 13.9 | 45 | 3.3 | 27.9 | 51 | 47 |
| 2002 | (4.0) | 23.6 | 69 | 5.6 | 4.5 | 30.1 | (6.6) | 23.2 | 69 | 9.8 | (8.5) | 78 | 80 |
| 2003 | 10.3 | 19.5 | 75 | 5.0 | 19.3 | 24.9 | 12.9 | 18.7 | 73 | 6.9 | (8.9) | 78 | 71 |
| 2004 | (26.2) | 16.6 | 49 | 3.6 | (44.4) | 30.8 | (27.8) | 17.1 | 51 | 6.4 | 18.3 | 54 | 51 |
| Average Annual | 0.4 | 15.4 | 65 | 4.6 | (2.4) | 22.2 | (1.4) | 15.4 | 65 | 7.4 | 2.8 | 69 | 66 |
| Compound Annual | (1.0) | | | | (6.3) | | (2.7) | | | | 5.3 | | |

FIG. 6

COTTON (CSCE)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference (%) | Volatility Reduction (%) | Turnover Reduction (%) |
|---|---|---|---|---|---|---|---|---|---|---|---|---|---|
| 1991 | 5.5 | 14.2 | 68 | 4.4 | (5.8) | 19.9 | 3.7 | 13.8 | 67 | 6.3 | 11.3 | 72 | 62 |
| 1992 | (2.9) | 13.2 | 65 | 4.4 | (3.6) | 20.6 | (3.3) | 13.4 | 66 | 7.7 | 0.7 | 64 | 63 |
| 1993 | 8.5 | 14.1 | 72 | 4.5 | 9.6 | 16.5 | 2.5 | 13.5 | 71 | 7.0 | (1.0) | 76 | 65 |
| 1994 | 39.9 | 15.6 | 80 | 5.6 | 43.8 | 19.3 | 36.4 | 15.8 | 81 | 8.7 | (3.9) | 81 | 80 |
| 1995 | 22.6 | 22.2 | 84 | 5.6 | 35.1 | 25.8 | 17.5 | 22.4 | 82 | 7.6 | (12.5) | 86 | 80 |
| 1996 | (3.1) | 12.8 | 64 | 4.5 | (4.7) | 19.0 | (3.9) | 13.7 | 64 | 10.3 | 1.6 | 68 | 64 |
| 1997 | (7.2) | 7.1 | 51 | 4.0 | (14.6) | 12.2 | (10.2) | 7.0 | 52 | 7.2 | 7.5 | 58 | 57 |
| 1998 | (4.3) | 14.4 | 63 | 4.6 | (10.3) | 19.6 | (6.6) | 14.1 | 63 | 7.4 | 6.0 | 73 | 66 |
| 1999 | (10.4) | 11.7 | 55 | 3.8 | (18.6) | 20.5 | (12.5) | 11.6 | 55 | 7.6 | 8.2 | 57 | 55 |
| 2000 | 2.2 | 16.8 | 73 | 5.4 | 10.0 | 22.8 | 5.9 | 17.3 | 72 | 7.6 | (7.8) | 74 | 77 |
| 2001 | (26.2) | 14.0 | 45 | 3.3 | (54.0) | 27.4 | (26.9) | 13.9 | 45 | 3.3 | 27.9 | 51 | 47 |
| 2002 | (4.0) | 23.6 | 69 | 5.6 | 4.5 | 30.1 | (6.6) | 23.2 | 69 | 9.8 | (8.5) | 78 | 80 |
| 2003 | 10.3 | 19.5 | 75 | 5.0 | 19.3 | 24.9 | 12.9 | 18.7 | 73 | 6.9 | (8.9) | 78 | 71 |
| 2004 | (26.2) | 16.6 | 49 | 3.6 | (44.4) | 30.8 | (27.8) | 17.1 | 51 | 6.4 | 18.3 | 54 | 51 |
| Average Annual | 0.4 | 15.4 | 65 | 4.6 | (2.4) | 22.2 | (1.4) | 15.4 | 65 | 7.4 | 2.8 | 69 | 66 |
| Compound Annual | (1.0) | | | | (6.3) | | (2.7) | | | | 5.3 | | |

CRUDE (NYMEX)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | Volatility Ratio (%) | Turnover Ratio (%) |
|---|---|---|---|---|---|---|---|---|---|---|---|---|---|
| 1991 | (5.9) | 32.1 | 74 | 9.0 | (16.2) | 49.1 | (12.1) | 33.1 | 75 | 11.4 | 10.3 | 66 | 75 |
| 1992 | 5.6 | 13.7 | 71 | 8.6 | 5.9 | 18.9 | 6.5 | 13.7 | 71 | 9.3 | (0.2) | 73 | 72 |
| 1993 | (20.0) | 11.3 | 57 | 7.1 | (32.8) | 21.1 | (19.2) | 10.7 | 56 | 9.1 | 12.8 | 54 | 59 |
| 1994 | 22.6 | 19.4 | 74 | 9.2 | 33.0 | 25.1 | 16.9 | 19.1 | 73 | 11.0 | (10.3) | 77 | 77 |
| 1995 | 29.4 | 13.6 | 82 | 9.9 | 29.6 | 16.4 | 28.3 | 13.6 | 82 | 10.3 | (0.2) | 83 | 83 |
| 1996 | 88.8 | 28.9 | 92 | 10.9 | 105.1 | 30.8 | 82.1 | 28.0 | 91 | 11.7 | (16.2) | 94 | 90 |
| 1997 | (21.4) | 18.1 | 65 | 7.9 | (25.2) | 25.1 | (17.3) | 18.0 | 64 | 8.6 | 3.8 | 72 | 66 |
| 1998 | (24.4) | 19.5 | 51 | 6.3 | (45.5) | 38.0 | (23.3) | 19.6 | 50 | 8.1 | 21.1 | 51 | 53 |
| 1999 | 104.8 | 28.7 | 89 | 10.5 | 130.7 | 32.8 | 107.5 | 28.9 | 89 | 11.0 | (26.0) | 87 | 88 |
| 2000 | 38.6 | 32.2 | 85 | 9.9 | 50.3 | 37.3 | 43.2 | 31.9 | 84 | 10.8 | (11.7) | 86 | 83 |
| 2001 | (20.0) | 26.9 | 62 | 7.1 | (20.1) | 39.9 | (18.1) | 25.1 | 62 | 10.3 | 0.1 | 67 | 59 |
| 2002 | 47.0 | 26.5 | 83 | 10.1 | 65.3 | 31.8 | 49.8 | 26.4 | 81 | 11.1 | (18.3) | 83 | 84 |
| 2003 | 19.9 | 28.1 | 82 | 9.3 | 36.6 | 33.5 | 25.5 | 26.9 | 82 | 10.2 | (16.7) | 84 | 78 |
| 2004 | 47.5 | 29.5 | 87 | 10.3 | 54.6 | 34.7 | 44.4 | 29.2 | 86 | 11.2 | (7.1) | 85 | 87 |
| Average Annual | 22.3 | 23.5 | 75 | 9.0 | 26.5 | 31.1 | 22.4 | 23.2 | 75 | 10.3 | (4.2) | 76 | 75 |
| Compound Annual | 16.4 | | | | 16.3 | | 16.7 | | | | 0.0 | | |

FIG. 7

GOLD (COMEX)

| | NCCI | | | Long Only | | Target Allocation | | | | NCCI vs. Long Only | | |
|---|---|---|---|---|---|---|---|---|---|---|---|---|
| | NCCI Return | Annual StDev (%) | Average Allocation (%) | Turnover (Round Turns) | Long Only Return | Annual StDev (%) | Target Allocation Return | Annual StDev (%) | Average Allocation (%) | Turnover (Round Turns) | Return Difference | Volatility Ratio (%) | Turnover Ratio (%) |
| 1991 | 6.1 | 8.7 | 59 | 3.5 | (10.1) | 12.8 | (6.6) | 10.4 | 62 | 5.9 | 4.0 | 68 | 58 |
| 1992 | (2.0) | 5.6 | 58 | 3.2 | (6.0) | 8.3 | (2.7) | 5.3 | 57 | 4.9 | 4.0 | 68 | 54 |
| 1993 | 16.5 | 12.1 | 76 | 4.5 | 17.9 | 14.6 | 17.5 | 11.8 | 77 | 7.5 | (1.4) | 83 | 75 |
| 1994 | (2.7) | 7.0 | 67 | 3.7 | (1.2) | 9.8 | (2.3) | 6.8 | 64 | 6.8 | (1.5) | 71 | 62 |
| 1995 | 1.9 | 4.4 | 60 | 3.5 | 1.6 | 6.8 | 0.6 | 4.7 | 61 | 8.2 | 0.3 | 65 | 58 |
| 1996 | 1.5 | 4.5 | 56 | 3.3 | (3.4) | 6.2 | 1.0 | 4.4 | 56 | 5.6 | 4.9 | 73 | 54 |
| 1997 | (8.6) | 6.6 | 49 | 2.9 | (20.3) | 12.7 | (8.6) | 6.7 | 51 | 5.0 | 11.7 | 52 | 49 |
| 1998 | (0.8) | 8.1 | 64 | 3.8 | (0.7) | 13.0 | (0.3) | 8.6 | 65 | 8.3 | (1.5) | 62 | 64 |
| 1999 | (0.1) | 11.3 | 54 | 3.4 | 1.6 | 17.2 | 3.9 | 14.7 | 56 | 5.3 | (1.7) | 68 | 56 |
| 2000 | (3.4) | 9.5 | 56 | 3.8 | (5.1) | 15.2 | (5.0) | 10.4 | 58 | 6.0 | 1.6 | 63 | 63 |
| 2001 | (1.0) | 10.3 | 66 | 4.0 | 2.1 | 13.9 | (3.3) | 10.8 | 68 | 8.2 | (3.0) | 74 | 67 |
| 2002 | 18.8 | 11.1 | 82 | 4.8 | 24.9 | 13.6 | 18.5 | 11.5 | 82 | 6.7 | (6.0) | 81 | 80 |
| 2003 | 14.3 | 14.0 | 81 | 4.6 | 19.3 | 16.7 | 15.1 | 14.1 | 81 | 6.7 | (4.9) | 84 | 77 |
| 2004 | 1.3 | 12.8 | 78 | 4.6 | 5.2 | 16.3 | (0.3) | 12.9 | 77 | 8.4 | (3.9) | 79 | 77 |
| Average Annual | 2.1 | 9.0 | 65 | 3.8 | 1.9 | 12.6 | 2.0 | 9.5 | 65 | 6.7 | 0.2 | 71 | 64 |
| Compound Annual | 1.8 | | | | 1.3 | | 1.7 | | | | 0.5 | | |

HEATOIL (NYMEX)

| | NCCI | | | Long Only | | Target Allocation | | | | NCCI vs. Long Only | | |
|---|---|---|---|---|---|---|---|---|---|---|---|---|
| | NCCI Return | Annual StDev (%) | Average Allocation (%) | Turnover (Round Turns) | Long Only Return | Annual StDev (%) | Target Allocation Return | Annual StDev (%) | Average Allocation (%) | Turnover (Round Turns) | Return Difference | Volatility Ratio (%) | Turnover Ratio (%) |
| 1991 | (10.1) | 29.2 | 74 | 8.8 | (21.3) | 46.1 | (14.1) | 31.7 | 74 | 10.1 | 11.2 | 63 | 73 |
| 1992 | 4.8 | 15.1 | 71 | 8.8 | 6.9 | 20.8 | 5.0 | 14.6 | 70 | 9.1 | (2.2) | 72 | 74 |
| 1993 | (16.7) | 11.2 | 59 | 7.3 | (26.9) | 19.4 | (15.9) | 11.1 | 59 | 8.9 | 10.2 | 58 | 61 |
| 1994 | 7.2 | 18.8 | 70 | 8.6 | 14.9 | 25.9 | 3.9 | 18.6 | 69 | 11.8 | (7.6) | 73 | 72 |
| 1995 | 9.7 | 13.4 | 68 | 8.1 | 13.3 | 17.6 | 10.7 | 13.0 | 69 | 10.3 | (3.7) | 76 | 67 |
| 1996 | 58.8 | 25.9 | 90 | 10.7 | 72.4 | 27.6 | 49.9 | 25.5 | 89 | 12.1 | 13.7 | 94 | 89 |
| 1997 | (21.5) | 17.3 | 62 | 7.6 | (26.8) | 24.7 | (17.7) | 18.0 | 61 | 9.7 | 5.4 | 70 | 63 |
| 1998 | (23.1) | 16.7 | 49 | 6.1 | (45.6) | 33.6 | (23.0) | 17.4 | 49 | 6.8 | 22.5 | 50 | 51 |
| 1999 | 72.0 | 27.8 | 84 | 10.2 | 84.3 | 33.2 | 76.9 | 27.9 | 84 | 10.7 | (12.3) | 84 | 85 |
| 2000 | 65.0 | 33.2 | 87 | 10.3 | 82.0 | 38.0 | 64.8 | 33.0 | 86 | 11.6 | (16.9) | 87 | 86 |
| 2001 | (21.5) | 23.8 | 60 | 6.6 | (30.3) | 37.0 | (17.7) | 21.9 | 59 | 8.8 | 8.8 | 64 | 55 |
| 2002 | 32.0 | 25.9 | 77 | 9.5 | 51.8 | 32.4 | 36.3 | 26.4 | 77 | 12.0 | (19.8) | 80 | 79 |
| 2003 | 19.7 | 30.2 | 80 | 9.3 | 31.0 | 36.3 | 25.0 | 29.5 | 81 | 11.2 | (11.3) | 83 | 77 |
| 2004 | 41.6 | 31.7 | 88 | 10.4 | 55.1 | 37.3 | 36.5 | 30.7 | 87 | 12.7 | (13.6) | 85 | 87 |
| Average Annual | 15.6 | 22.9 | 73 | 8.7 | 18.6 | 30.7 | 15.7 | 22.9 | 72 | 10.4 | (3.1) | 74 | 73 |
| Compound Annual | 11.2 | | | | 10.3 | | 11.5 | | | | 0.8 | | |

FIG. 8

HOGS (CME)

| | NCCI Return | NCCI Annual StDev (%) | NCCI Average Allocation (%) | NCCI Turnover (Round Turns) | Long Only Return | Long Only Annual StDev (%) | Target Allocation Return | Target Allocation Annual StDev (%) | Target Allocation Average Allocation (%) | Target Allocation Turnover (Round Turns) | NCCI vs. Long Only Return Difference | NCCI vs. Long Only Volatility Ratio (%) | NCCI vs. Long Only Turnover Ratio (%) |
|---|---|---|---|---|---|---|---|---|---|---|---|---|---|
| 1991 | 1.8 | 11.0 | 68 | 4.2 | (1.4) | 15.3 | 1.9 | 10.8 | 67 | 6.6 | 3.2 | 72 | 60 |
| 1992 | 20.8 | 12.6 | 81 | 5.3 | 30.7 | 15.0 | 17.5 | 12.2 | 82 | 7.4 | (9.8) | 84 | 77 |
| 1993 | 21.8 | 16.3 | 82 | 5.3 | 26.0 | 18.5 | 17.4 | 16.1 | 81 | 6.7 | (4.2) | 68 | 75 |
| 1994 | (8.2) | 9.4 | 52 | 3.4 | (15.1) | 17.7 | (6.7) | 9.8 | 55 | 4.2 | 6.9 | 53 | 49 |
| 1995 | 9.3 | 15.5 | 84 | 5.7 | 14.9 | 18.2 | 6.7 | 15.0 | 80 | 7.6 | (5.6) | 85 | 81 |
| 1996 | 24.2 | 15.5 | 83 | 5.4 | 38.4 | 18.1 | 26.4 | 14.9 | 79 | 7.6 | (14.2) | 86 | 76 |
| 1997 | (4.5) | 11.1 | 65 | 4.5 | (7.5) | 16.6 | (1.7) | 12.3 | 66 | 8.2 | 3.0 | 67 | 65 |
| 1998 | (24.5) | 15.0 | 57 | 4.1 | (43.3) | 28.8 | (20.2) | 14.3 | 56 | 5.2 | 18.8 | 52 | 59 |
| 1999 | 18.5 | 21.1 | 78 | 5.3 | 21.1 | 30.0 | 17.5 | 21.0 | 77 | 7.5 | (2.6) | 70 | 75 |
| 2000 | 22.3 | 14.8 | 79 | 5.1 | 27.5 | 19.1 | 22.7 | 14.0 | 79 | 7.3 | (5.2) | 78 | 73 |
| 2001 | 17.8 | 17.9 | 83 | 5.4 | 28.2 | 21.2 | 18.1 | 16.2 | 80 | 9.3 | (10.3) | 85 | 77 |
| 2002 | (5.2) | 19.0 | 69 | 4.3 | (12.1) | 29.1 | (1.0) | 19.3 | 70 | 7.7 | 6.9 | 66 | 62 |
| 2003 | (8.9) | 17.5 | 56 | 4.8 | (7.4) | 25.0 | (2.6) | 17.2 | 66 | 7.0 | (1.5) | 70 | 69 |
| 2004 | 60.9 | 19.7 | 91 | 6.1 | 77.5 | 21.6 | 58.1 | 19.1 | 90 | 8.8 | (16.7) | 91 | 88 |
| Average Annual | 10.4 | 15.5 | 74 | 4.9 | 12.7 | 21.0 | 11.0 | 15.2 | 73 | 7.2 | (2.2) | 75 | 70 |
| Compound Annual | 8.6 | | | | 8.9 | | 9.6 | | | | (0.2) | | |

NAT GAS (NYMEX)

| | NCCI Return | NCCI Annual StDev (%) | NCCI Average Allocation (%) | NCCI Turnover (Round Turns) | Long Only Return | Long Only Annual StDev (%) | Target Allocation Return | Target Allocation Annual StDev (%) | Target Allocation Average Allocation (%) | Target Allocation Turnover (Round Turns) | NCCI vs. Long Only Return Difference | NCCI vs. Long Only Volatility Ratio (%) | NCCI vs. Long Only Turnover Ratio (%) |
|---|---|---|---|---|---|---|---|---|---|---|---|---|---|
| 1991 | (14.4) | 12.3 | 58 | 7.1 | (35.6) | 22.3 | (14.6) | 12.4 | 58 | 7.7 | 21.2 | 55 | 59 |
| 1992 | 52.9 | 27.5 | 77 | 9.2 | 53.7 | 33.3 | 49.9 | 27.4 | 77 | 10.1 | (0.8) | 83 | 77 |
| 1993 | 21.3 | 23.1 | 67 | 8.3 | 20.1 | 30.2 | 27.3 | 22.9 | 67 | 9.1 | 1.3 | 76 | 69 |
| 1994 | (12.2) | 19.9 | 57 | 6.8 | (28.2) | 33.6 | (8.3) | 20.0 | 57 | 7.4 | 16.1 | 59 | 57 |
| 1995 | 26.6 | 27.5 | 70 | 8.3 | 16.7 | 38.3 | 26.4 | 27.5 | 70 | 9.9 | 9.9 | 72 | 69 |
| 1996 | 60.9 | 46.9 | 85 | 10.1 | 74.0 | 50.6 | 62.0 | 45.0 | 85 | 10.7 | (13.1) | 91 | 64 |
| 1997 | 11.2 | 41.2 | 73 | 8.3 | 9.5 | 51.2 | 22.8 | 40.0 | 73 | 9.6 | 1.7 | 80 | 69 |
| 1998 | (28.6) | 26.7 | 58 | 6.8 | (35.3) | 46.9 | (23.3) | 26.5 | 59 | 8.2 | 6.7 | 57 | 57 |
| 1999 | (2.3) | 30.2 | 71 | 8.6 | 2.9 | 40.2 | 0.9 | 29.7 | 71 | 9.8 | (5.2) | 75 | 72 |
| 2000 | 244.5 | 40.8 | 89 | 10.5 | 315.0 | 42.8 | 254.8 | 40.6 | 89 | 10.8 | (70.5) | 95 | 88 |
| 2001 | (53.6) | 51.3 | 52 | 6.2 | (73.0) | 64.6 | (50.9) | 51.6 | 51 | 7.6 | 19.5 | 79 | 51 |
| 2002 | 32.8 | 34.7 | 73 | 8.8 | 51.1 | 43.5 | 39.3 | 35.4 | 73 | 9.5 | (18.3) | 80 | 73 |
| 2003 | 21.4 | 44.0 | 74 | 8.6 | 35.8 | 53.0 | 30.1 | 46.0 | 74 | 10.0 | (14.4) | 83 | 71 |
| 2004 | (8.9) | 33.7 | 70 | 8.1 | (15.3) | 44.8 | (9.8) | 33.0 | 71 | 10.1 | 6.3 | 75 | 68 |
| Average Annual | 25.1 | 32.8 | 70 | 8.3 | 27.9 | 42.5 | 29.0 | 32.7 | 70 | 9.3 | (2.8) | 76 | 69 |
| Compound Annual | 12.5 | | | | 6.6 | | 16.3 | | | | 5.8 | | |

FIG. 9

SOYBEANS(CBOT)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | NCCI vs. Long Only Turnover Ratio (%) |
|---|---|---|---|---|---|---|---|---|---|---|---|---|---|
| 1991 | (7.1) | 13.9 | 59 | 4.0 | (7.4) | 21.9 | (8.3) | 14.9 | 59 | 8.7 | 0.3 | 64 | 58 |
| 1992 | (0.3) | 10.6 | 69 | 5.3 | (0.3) | 14.7 | (2.1) | 11.4 | 71 | 10.0 | 0.0 | 72 | 76 |
| 1993 | 19.1 | 13.9 | 80 | 6.2 | 23.5 | 17.0 | 16.1 | 14.1 | 77 | 8.2 | (4.4) | 82 | 88 |
| 1994 | (14.6) | 13.1 | 63 | 4.5 | (16.6) | 17.8 | (14.9) | 13.6 | 62 | 6.5 | 2.0 | 74 | 65 |
| 1995 | 20.4 | 13.1 | 78 | 5.6 | 28.4 | 16.1 | 19.1 | 14.3 | 78 | 7.7 | (8.0) | 82 | 80 |
| 1996 | (7.2) | 14.4 | 72 | 4.6 | (1.6) | 19.2 | (3.9) | 14.7 | 70 | 8.8 | (5.6) | 75 | 66 |
| 1997 | 23.0 | 19.2 | 79 | 5.4 | 24.8 | 24.4 | 20.2 | 18.1 | 79 | 7.4 | (1.8) | 79 | 77 |
| 1998 | (11.5) | 11.3 | 58 | 4.1 | (17.0) | 17.6 | (10.7) | 12.3 | 58 | 6.0 | 5.5 | 64 | 59 |
| 1999 | (6.3) | 13.7 | 56 | 3.9 | (15.7) | 23.8 | (9.2) | 15.6 | 57 | 6.2 | 9.4 | 58 | 56 |
| 2000 | 4.1 | 15.0 | 72 | 5.1 | 6.2 | 19.7 | 8.2 | 15.3 | 74 | 7.7 | (2.1) | 76 | 72 |
| 2001 | (4.8) | 15.1 | 62 | 4.6 | (15.8) | 19.3 | (3.1) | 14.9 | 60 | 0.1 | 11.0 | 78 | 66 |
| 2002 | 31.3 | 17.4 | 84 | 6.4 | 42.1 | 19.6 | 26.1 | 17.4 | 84 | 10.1 | (10.8) | 89 | 91 |
| 2003 | 53.5 | 19.4 | 85 | 5.7 | 60.5 | 22.7 | 52.0 | 19.5 | 85 | 8.2 | (7.1) | 85 | 81 |
| 2004 | (3.1) | 23.1 | 66 | 4.4 | (14.2) | 34.3 | (4.4) | 22.3 | 67 | 0.1 | 11.2 | 68 | 62 |
| Average Annual | 6.9 | 15.2 | 70 | 5.0 | 6.9 | 20.6 | 6.1 | 15.7 | 70 | 7.7 | 0.0 | 75 | 71 |
| Compound Annual | 5.4 | | | | 4.4 | | 4.7 | | | | 0.9 | | |

UNLEADED (NYMEX)

| | NCCI Return | Annual StDev (%) | NCCI Average Allocation (%) | Turnover (Round Turns) | Long Only Return | Long Only Annual StDev (%) | Target Allocation Return | Target Allocation Annual StDev (%) | Target Allocation Average Allocation (%) | Turnover (Round Turns) | NCCI vs. Long Only Return Difference | NCCI vs. Long Only Volatility Ratio (%) | NCCI vs. Long Only Turnover Ratio (%) |
|---|---|---|---|---|---|---|---|---|---|---|---|---|---|
| 1991 | 2.4 | 25.6 | 73 | 8.3 | 0.5 | 40.1 | 2.2 | 28.2 | 73 | 9.5 | 1.8 | 64 | 69 |
| 1992 | (4.2) | 13.8 | 68 | 8.4 | (1.0) | 19.7 | (7.6) | 13.6 | 68 | 11.1 | (3.2) | 70 | 70 |
| 1993 | (21.2) | 11.2 | 58 | 6.9 | (32.0) | 19.8 | (21.2) | 10.6 | 57 | 8.4 | 10.8 | 57 | 57 |
| 1994 | 10.4 | 21.2 | 75 | 9.0 | 17.5 | 30.4 | 8.0 | 20.2 | 74 | 11.1 | (7.1) | 70 | 75 |
| 1995 | 22.9 | 14.6 | 77 | 9.2 | 30.8 | 18.0 | 23.4 | 14.4 | 78 | 10.3 | (7.9) | 81 | 77 |
| 1996 | 49.5 | 25.1 | 88 | 10.2 | 64.2 | 27.5 | 47.8 | 24.5 | 88 | 11.3 | (14.7) | 91 | 84 |
| 1997 | (10.9) | 16.8 | 70 | 8.8 | (8.9) | 22.9 | (8.7) | 16.5 | 69 | 9.7 | 2.0 | 73 | 73 |
| 1998 | (20.0) | 15.4 | 51 | 6.3 | (40.0) | 30.6 | (22.7) | 15.7 | 51 | 7.8 | 20.0 | 50 | 53 |
| 1999 | 67.4 | 25.9 | 84 | 10.2 | 89.4 | 30.6 | 73.1 | 25.9 | 84 | 10.7 | (22.0) | 85 | 85 |
| 2000 | 58.0 | 30.5 | 85 | 10.0 | 77.6 | 35.5 | 67.9 | 30.1 | 84 | 11.1 | (19.6) | 86 | 84 |
| 2001 | (5.2) | 24.5 | 68 | 8.1 | (9.0) | 33.6 | (3.9) | 23.4 | 67 | 8.7 | 3.8 | 73 | 67 |
| 2002 | 32.2 | 25.4 | 81 | 9.7 | 48.5 | 30.1 | 25.6 | 26.3 | 80 | 11.8 | (16.3) | 84 | 80 |
| 2003 | 30.7 | 28.2 | 83 | 9.6 | 45.7 | 32.3 | 30.2 | 27.8 | 82 | 10.0 | (14.9) | 88 | 79 |
| 2004 | 23.1 | 30.0 | 87 | 10.5 | 29.0 | 35.2 | 22.4 | 29.3 | 85 | 11.2 | (5.9) | 85 | 88 |
| Average Annual | 16.8 | 22.0 | 75 | 8.9 | 22.3 | 29.0 | 16.9 | 21.9 | 74 | 10.2 | (5.5) | 75 | 75 |
| Compound Annual | 13.6 | | | | 16.0 | | 13.3 | | | | 2.4 | | |

| WHEAT (CBOT) | NCCI | | | | Long Only | | Target Allocation | | | | NCCI vs. Long Only | | |
|---|---|---|---|---|---|---|---|---|---|---|---|---|---|
| | NCCI Return | Annual StDev (%) | Average Allocation (%) | Turnover (Round Turns) | Long Only Return | Annual StDev (%) | Target Allocation Return | Annual StDev (%) | Average Allocation (%) | Turnover (Round Turns) | Return Difference | Volatility Ratio (%) | Turnover Ratio (%) |
| 1991 | 33.1 | 15.2 | 78 | 4.0 | 41.5 | 19.6 | 31.6 | 15.4 | 79 | 5.1 | (8.4) | 77 | 79 |
| 1992 | 0.6 | 13.5 | 69 | 3.0 | (4.2) | 18.2 | (2.6) | 13.6 | 69 | 5.2 | 4.8 | 74 | 60 |
| 1993 | 18.4 | 12.0 | 72 | 3.8 | 19.4 | 15.9 | 16.0 | 12.4 | 73 | 5.3 | (1.0) | 76 | 77 |
| 1994 | 8.7 | 15.8 | 74 | 3.3 | 12.2 | 20.0 | 9.8 | 15.6 | 73 | 7.4 | (3.4) | 79 | 67 |
| 1995 | 37.3 | 20.8 | 84 | 4.3 | 41.1 | 22.6 | 41.0 | 20.3 | 83 | 6.9 | (3.8) | 92 | 85 |
| 1996 | 1.0 | 20.8 | 68 | 3.2 | (9.4) | 26.2 | 0.2 | 20.3 | 65 | 6.7 | 10.3 | 79 | 64 |
| 1997 | (4.0) | 16.7 | 66 | 3.2 | (10.8) | 22.0 | (2.5) | 16.8 | 66 | 5.7 | 6.8 | 76 | 64 |
| 1998 | (13.0) | 10.8 | 50 | 2.5 | (26.3) | 20.5 | (15.0) | 12.0 | 54 | 4.4 | 13.2 | 53 | 50 |
| 1999 | (14.2) | 13.0 | 51 | 2.6 | (24.6) | 24.2 | (14.0) | 14.1 | 53 | 5.5 | 10.4 | 54 | 52 |
| 2000 | (8.0) | 15.3 | 63 | 3.5 | (6.8) | 23.7 | (9.3) | 15.4 | 64 | 9.5 | (1.3) | 65 | 69 |
| 2001 | (10.8) | 11.9 | 57 | 3.1 | (13.8) | 20.5 | (15.1) | 12.3 | 60 | 8.0 | 3.0 | 58 | 62 |
| 2002 | 14.5 | 20.7 | 73 | 3.8 | 8.4 | 24.9 | 19.6 | 19.8 | 72 | 6.0 | 6.1 | 83 | 76 |
| 2003 | 4.3 | 20.4 | 72 | 3.7 | 13.3 | 27.0 | 8.6 | 20.3 | 70 | 5.6 | (9.0) | 76 | 73 |
| 2004 | (15.2) | 16.8 | 54 | 2.8 | (24.3) | 28.3 | (16.8) | 17.8 | 56 | 7.4 | 9.1 | 59 | 57 |
| Average Annual | 3.8 | 16.0 | 66 | 3.3 | 1.1 | 22.4 | 3.7 | 16.2 | 67 | 6.3 | 2.6 | 72 | 67 |
| Compound Annual | 2.5 | | | | (1.1) | | 2.3 | | | | 3.6 | | |

*FIG. 10*

Computing the Total Return Index and the Target Allocation

| Date | Prior LRD | Nearby LRD | Nearby Price | Nextout Price | Nearby Allocation | Nextout Allocation | Spot Index | Spot Rtn (log) | Roll Rtn (log) | Total Rtn (log) | Total Rtn Index | Target Allocation |
|---|---|---|---|---|---|---|---|---|---|---|---|---|
| 8/2/04 | 7/2/2004 | 9/3/2004 | 88.500 | 89.625 | 0.51 | 0.49 | 89.05 | -0.03% | -0.06% | -0.09% | 1.9313 | 80% |
| 8/3/04 | 7/2/2004 | 9/3/2004 | 86.375 | 87.525 | 0.49 | 0.51 | 86.96 | -2.38% | -0.02% | -2.40% | 1.8855 | 80% |
| 8/4/04 | 7/2/2004 | 9/3/2004 | 87.500 | 89.275 | 0.48 | 0.52 | 88.43 | 1.68% | -0.03% | -1.64% | 1.9168 | 80% |
| 8/5/04 | 7/2/2004 | 9/3/2004 | 87.400 | 89.000 | 0.46 | 0.54 | 88.26 | -0.19% | -0.03% | -0.22% | 1.9126 | 100% |
| 8/6/04 | 7/2/2004 | 9/3/2004 | 87.600 | 89.025 | 0.44 | 0.56 | 88.39 | 0.15% | -0.03% | 0.12% | 1.9149 | 100% |
| 8/9/04 | 7/2/2004 | 9/3/2004 | 88.875 | 90.100 | 0.40 | 0.60 | 89.61 | 1.37% | -0.07% | 1.31% | 1.9401 | 100% |
| 8/10/04 | 7/2/2004 | 9/3/2004 | 88.775 | 89.975 | 0.38 | 0.62 | 89.52 | -0.11% | -0.02% | -0.13% | 1.9376 | 100% |
| 8/11/04 | 7/2/2004 | 9/3/2004 | 87.300 | 89.100 | 0.37 | 0.63 | 88.44 | -1.21% | -0.03% | -1.24% | 1.9137 | 100% |
| 8/12/04 | 7/2/2004 | 9/3/2004 | 87.525 | 89.350 | 0.35 | 0.65 | 88.71 | 0.30% | -0.03% | 0.27% | 1.9190 | 60% |
| 8/13/04 | 7/2/2004 | 9/3/2004 | 89.800 | 90.825 | 0.33 | 0.67 | 90.48 | 1.98% | -0.02% | 1.98% | 1.9569 | 100% |
| 8/16/04 | 7/2/2004 | 9/3/2004 | 89.350 | 90.925 | 0.29 | 0.71 | 90.48 | -0.01% | -0.08% | -0.09% | 1.9551 | 80% |
| 8/17/04 | 7/2/2004 | 9/3/2004 | 89.025 | 90.975 | 0.27 | 0.73 | 90.45 | -0.03% | -0.03% | -0.06% | 1.9539 | 80% |
| 8/18/04 | 7/2/2004 | 9/3/2004 | 88.675 | 90.575 | 0.25 | 0.75 | 90.09 | -0.39% | -0.03% | -0.43% | 1.9455 | 80% |
| 8/19/04 | 7/2/2004 | 9/3/2004 | 86.550 | 88.850 | 0.24 | 0.76 | 88.30 | -2.01% | -0.04% | -2.05% | 1.9061 | 80% |
| 8/20/04 | 7/2/2004 | 9/3/2004 | 86.275 | 88.475 | 0.22 | 0.78 | 87.99 | -0.36% | -0.04% | -0.40% | 1.8985 | 60% |
| 8/23/04 | 7/2/2004 | 9/3/2004 | 85.825 | 88.225 | 0.17 | 0.83 | 87.81 | -0.20% | -0.13% | -0.38% | 1.8922 | 60% |
| 8/24/04 | 7/2/2004 | 9/3/2004 | 83.950 | 86.700 | 0.15 | 0.84 | 86.26 | -1.77% | -0.05% | 1.82% | 1.8580 | 60% |
| 8/25/04 | 7/2/2004 | 9/3/2004 | 83.550 | 86.600 | 0.14 | 0.86 | 86.16 | -0.12% | -0.06% | -0.17% | 1.8548 | 40% |
| 8/26/04 | 7/2/2004 | 9/3/2004 | 83.050 | 86.000 | 0.13 | 0.87 | 85.63 | -0.63% | -0.05% | -0.68% | 1.8422 | 40% |
| 8/27/04 | 7/2/2004 | 9/3/2004 | 82.850 | 85.900 | 0.11 | 0.89 | 85.56 | -0.08% | -0.06% | -0.13% | 1.8398 | 40% |
| 8/30/04 | 7/2/2004 | 9/3/2004 | 84.425 | 87.300 | 0.06 | 0.94 | 87.12 | 1.80% | -0.16% | 1.64% | 1.8703 | 40% |
| 8/31/04 | 7/2/2004 | 9/3/2004 | 84.650 | 87.450 | 0.05 | 0.95 | 87.32 | 0.23% | -0.05% | 0.18% | 1.8736 | 40% |

*FIG. 11*

Computing of the Actual Allocation, Turnover, and Daily Return

| Date | Target Allocation | Daily Roll Quant. | Max NB Allocation | Starting Nearby | Starting Nextout | Starting Actual | Ending Nearby | Ending Nextout | Ending Actual | Turnover (Sides) | Profit/Loss ($) | Daily Rtn (ln) |
|---|---|---|---|---|---|---|---|---|---|---|---|---|
| 8/2/04  | 0.80 | 4.8% | 0.508 | 0.556 | 0.309 | 0.864 | 0.5079 | 0.3089 | 0.817 | 4.8%  | (0.100) | -0.11% |
| 8/3/04  | 0.80 | 1.6% | 0.492 | 0.508 | 0.309 | 0.817 | 0.4921 | 0.3089 | 0.801 | 1.6%  | (1.728) | -1.96% |
| 8/4/04  | 0.80 | 1.6% | 0.476 | 0.492 | 0.309 | 0.801 | 0.4762 | 0.3238 | 0.800 | 3.1%  | 1.094   | 1.25%  |
| 8/5/04  | 1.00 | 1.6% | 0.460 | 0.476 | 0.324 | 0.800 | 0.4603 | 0.3556 | 0.816 | 4.8%  | (0.137) | -0.15% |
| 8/6/04  | 1.00 | 1.6% | 0.444 | 0.460 | 0.356 | 0.816 | 0.4444 | 0.3873 | 0.832 | 4.8%  | 0.101   | 0.11%  |
| 8/9/04  | 1.00 | 4.8% | 0.397 | 0.444 | 0.387 | 0.832 | 0.3968 | 0.4825 | 0.879 | 14.3% | 0.983   | 1.11%  |
| 8/10/04 | 1.00 | 1.6% | 0.381 | 0.397 | 0.483 | 0.879 | 0.3810 | 0.5143 | 0.895 | 4.8%  | (0.100) | -0.11% |
| 8/11/04 | 1.00 | 1.6% | 0.365 | 0.381 | 0.514 | 0.895 | 0.3651 | 0.5460 | 0.911 | 4.8%  | (1.012) | -1.14% |
| 8/12/04 | 0.60 | 1.6% | 0.349 | 0.365 | 0.546 | 0.911 | 0.3492 | 0.5460 | 0.895 | 1.6%  | 0.219   | 0.25%  |
| 8/13/04 | 1.00 | 1.6% | 0.333 | 0.349 | 0.546 | 0.895 | 0.3333 | 0.5778 | 0.911 | 4.8%  | 1.600   | 1.79%  |
| 8/16/04 | 0.80 | 4.8% | 0.286 | 0.333 | 0.578 | 0.911 | 0.2857 | 0.5778 | 0.863 | 4.8%  | (0.092) | -0.10% |
| 8/17/04 | 0.80 | 1.6% | 0.270 | 0.286 | 0.578 | 0.863 | 0.2698 | 0.5778 | 0.848 | 1.6%  | (0.064) | -0.07% |
| 8/18/04 | 0.80 | 1.6% | 0.254 | 0.270 | 0.578 | 0.848 | 0.2540 | 0.5778 | 0.832 | 1.6%  | (0.326) | -0.36% |
| 8/19/04 | 0.80 | 1.6% | 0.238 | 0.254 | 0.578 | 0.832 | 0.2381 | 0.5778 | 0.816 | 1.6%  | (1.536) | -1.72% |
| 8/20/04 | 0.60 | 1.6% | 0.222 | 0.238 | 0.578 | 0.816 | 0.2222 | 0.5778 | 0.800 | 1.6%  | (0.282) | -0.32% |
| 8/23/04 | 0.60 | 4.8% | 0.175 | 0.222 | 0.578 | 0.800 | 0.1746 | 0.5778 | 0.752 | 4.8%  | (0.244) | -0.28% |
| 8/24/04 | 0.60 | 1.6% | 0.159 | 0.175 | 0.578 | 0.752 | 0.1587 | 0.5778 | 0.737 | 1.6%  | (1.208) | -1.39% |
| 8/25/04 | 0.40 | 1.6% | 0.143 | 0.159 | 0.578 | 0.737 | 0.1429 | 0.5778 | 0.721 | 1.6%  | (0.121) | -0.14% |
| 8/26/04 | 0.40 | 1.6% | 0.127 | 0.143 | 0.578 | 0.721 | 0.1270 | 0.5778 | 0.705 | 1.6%  | (0.418) | -0.49% |
| 8/27/04 | 0.40 | 1.6% | 0.111 | 0.127 | 0.578 | 0.705 | 0.1111 | 0.5778 | 0.689 | 1.6%  | (0.083) | -0.10% |
| 8/30/04 | 0.40 | 4.8% | 0.063 | 0.111 | 0.578 | 0.689 | 0.0635 | 0.5778 | 0.641 | 4.8%  | 0.984   | 1.14%  |
| 8/31/04 | 0.40 | 1.6% | 0.048 | 0.063 | 0.578 | 0.641 | 0.0476 | 0.5778 | 0.625 | 1.6%  | 0.101   | 0.12%  |

*FIG. 12*

Hypothetical Return* Performance for AIA Global,
Long Unhedged Index and MSCI Global, 1991-2005

| Year | Annual Return (%) | | |
|---|---|---|---|
| | AIA Global | Long Unhedged | MSCI Global |
| 1991 | 16.2 | 21.6 | |
| 1992 | 3.9 | 2.6 | |
| 1993 | 14.1 | 19.8 | |
| 1994 | 0.8 | 2.4 | |
| 1995 | 20.4 | 21.1 | |
| 1996 | 9.8 | 9.3 | |
| 1997 | 13.7 | 8.3 | |
| 1998 | 12.6 | 19.1 | |
| 1999 | 10.1 | 11.7 | |
| 2000 | 0.2 | (5.6) | |
| 2001 | 2.5 | (6.4) | (11.0) |
| 2002 | 7.1 | 2.4 | 4.8 |
| 2003 | 17.4 | 28.0 | 30.2 |
| 2004 | 6.4 | 13.0 | 16.7 |
| 2005 | 4.1 | 2.6 | 1.6 |
| | | | |
| Return 1991-2005 | 9.1 | 9.5 | |
| Standard Deviation | 4.5 | 7.9 | |
| Return over LIBOR | 4.1 | 4.5 | |
| Sharpe 1991-2005 | 0.91 | 0.57 | |
| | | | |
| Return 1991-2005 | 7.4 | 7.3 | 9.3 |
| Standard Deviation | 4.5 | 8.1 | 9.3 |
| Return over LIBOR | 4.3 | 4.2 | 4.3 |
| Sharpe 1991-2005 | 0.96 | 0.52 | 0.47 |

*Returns include a collateral return equal to USD 3M LIBOR

*FIG. 14*

COUNTRY PERFORMANCE: 100% ALLOCATED TO EACH COUNTRY, 50% EQUITY 50% 10YR BONDS

| | United States | | Japan | | Euro-Zone | | Switzerland | | Canada | | United Kingdom | | Australia | |
|---|---|---|---|---|---|---|---|---|---|---|---|---|---|---|
| | Long 50% Hedged | Model Tactical Hedge | Long 50% Hedged | Model Tactical Hedge | Long 50% Hedged | Model Tactical Hedge | Long 50% Hedged | Model Tactical Hedge | Long 50% Hedged | Model Tactical Hedge | Long 50% Hedged | Model Tactical Hedge | Long 50% Hedged | Model Tactical Hedge |
| EXCESS RETURNS: 1991-2005 | | | | | | | | | | | | | | |
| AVERAGE DAILY RETURN | 5.5% | 3.6% | 1.1% | 2.4% | 6.2% | 6.8% | 6.8% | 6.1% | 5.6% | 4.8% | 3.8% | 1.8% | 5.7% | 4.6% |
| DAILY VOL | 8.6% | 5.4% | 12.9% | 8.4% | 11.9% | 8.7% | 9.8% | 8.3% | 8.7% | 6.6% | 11.9% | 7.4% | 9.6% | 7.9% |
| SHARPE RATIO | 0.65 | 0.66 | 0.09 | 0.28 | 0.52 | 0.78 | 0.69 | 0.73 | 0.64 | 0.73 | 0.32 | 0.24 | 0.59 | 0.58 |
| MAXIMUM DRAWDOWN | 23.7% | 9.0% | 40.2% | 22.7% | 39.3% | 15.4% | 28.0% | 18.3% | 29.5% | 14.2% | 31.4% | 21.0% | 20.8% | 20.6% |
| COMPOUND RETURN | 5.3% | 3.5% | 0.3% | 2.0% | 5.7% | 6.7% | 6.5% | 5.9% | 5.4% | 4.7% | 3.1% | 1.5% | 5.4% | 4.4% |
| SHARPE (COMPOUND RET) | 0.62 | 0.65 | 0.02 | 0.24 | 0.48 | 0.77 | 0.67 | 0.72 | 0.62 | 0.72 | 0.26 | 0.20 | 0.56 | 0.55 |
| SINCE 2001: EXCESS RETURNS | | | | | | | | | | | | | | |
| AVE DAILY RET | 1.8% | 1.3% | 3.2% | 3.4% | 4.3% | 8.4% | 4.2% | 5.5% | 7.3% | 8.1% | 4.4% | 3.4% | 9.1% | 8.7% |
| DAILY VOL | 8.6% | 4.3% | 12.1% | 7.9% | 13.0% | 8.2% | 10.0% | 7.6% | 8.0% | 7.0% | 11.6% | 6.7% | 8.5% | 8.9% |
| SHARPE | 0.21 | 0.30 | 0.26 | 0.43 | 0.33 | 1.02 | 0.42 | 0.73 | 0.91 | 1.14 | 0.38 | 0.51 | 1.07 | 0.98 |
| MAX DD | 20.5% | 5.0% | 23.8% | 10.5% | 33.4% | 11.0% | 20.1% | 8.3% | 21.6% | 7.9% | 19.1% | 8.6% | 12.8% | 11.5% |
| COMPOUND RET | 1.4% | 1.2% | 1.8% | 3.2% | 4.0% | 8.9% | 4.4% | 5.8% | 7.3% | 8.2% | 4.0% | 1.5% | 9.4% | 8.8% |
| SHARPE COMP. | 0.17 | 0.28 | 0.15 | 0.40 | 0.31 | 1.09 | 0.44 | 0.77 | 0.92 | 1.16 | 0.35 | 0.22 | 1.10 | 1.00 |
| CORREL MSCI GLOB | 0.80 | 0.42 | 0.39 | 0.29 | 0.69 | 0.39 | 0.57 | 0.26 | 0.66 | 0.40 | 0.58 | 0.35 | 0.38 | 0.34 |

UNITED STATES

| Year | Equity | | | Bonds | | | Cash |
|---|---|---|---|---|---|---|---|
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | 9.7 | 22.8 | 12.2 | 18.8 | 16.2 | 21.6 | 12.2 | 18.8 | 6.2 |
| 1992 | (0.2) | 3.5 | 6.9 | 10.0 | 3.9 | 2.6 | 6.9 | 10.0 | 4.0 |
| 1993 | 3.1 | 6.4 | 5.9 | 10.2 | 14.1 | 19.8 | 5.9 | 10.2 | 3.4 |
| 1994 | (4.2) | (3.4) | 9.1 | 13.0 | 0.8 | 2.4 | 9.1 | 13.0 | 4.9 |
| 1995 | 26.9 | 29.4 | 6.7 | 9.5 | 20.4 | 21.1 | 6.7 | 9.5 | 6.3 |
| 1996 | 7.6 | 16.2 | 12.4 | 15.2 | 9.8 | 9.3 | 12.4 | 15.2 | 5.8 |
| 1997 | 15.2 | 25.8 | 8.8 | 12.6 | 13.7 | 8.3 | 8.8 | 12.6 | 6.0 |
| 1998 | 12.5 | 21.5 | 8.7 | 17.4 | 12.6 | 19.1 | 8.7 | 17.4 | 5.8 |
| 1999 | 6.2 | 14.6 | 12.9 | 16.6 | 10.1 | 11.7 | 12.9 | 16.6 | 5.7 |
| 2000 | (11.3) | (14.9) | 14.3 | 17.8 | 0.2 | (5.6) | 14.3 | 17.8 | 6.8 |
| 2001 | (3.4) | (15.2) | 12.0 | 19.5 | 2.5 | (6.4) | 12.0 | 19.5 | 3.9 |
| 2002 | (10.1) | (23.5) | 13.6 | 17.2 | 7.1 | 2.4 | 13.6 | 17.2 | 1.8 |
| 2003 | 18.2 | 27.1 | 15.1 | 19.3 | 17.4 | 28.0 | 15.1 | 19.3 | 1.2 |
| 2004 | 3.8 | 9.1 | 16.2 | 20.6 | 6.4 | 13.0 | 16.2 | 20.6 | 1.7 |
| 2005 | (3.5) | 1.2 | 14.2 | 18.7 | 4.1 | 2.6 | 14.2 | 18.7 | 3.6 |
| 1991-2005 Full Period | 4.2 | 5.8 | 9.5 | 16.1 | 2.5 | 3.1 | 4.7 | 6.6 | 5.0 |
| Sharpe | 0.44 | 0.36 | | | 0.54 | 0.46 | | | |
| Largest Drawdown | 25.9 | 49.3 | | | 6.9 | 14.3 | | | |

| Year | JAPAN ||||||| Cash |
|---|---|---|---|---|---|---|---|---|
| | Equity |||| Bonds |||| |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | (7.3) | (10.6) | 12.2 | 18.8 | 16.2 | 21.6 | 12.2 | 18.8 | 7.8 |
| 1992 | (10.6) | (29.6) | 6.9 | 10.0 | 3.9 | 2.6 | 6.9 | 10.0 | 4.6 |
| 1993 | (1.7) | (0.1) | 5.9 | 10.2 | 14.1 | 19.8 | 5.9 | 10.2 | 3.1 |
| 1994 | 1.0 | 11.0 | 9.1 | 13.0 | 0.8 | 2.4 | 9.1 | 13.0 | 2.3 |
| 1995 | 5.7 | 0.2 | 6.7 | 9.5 | 20.4 | 21.1 | 6.7 | 9.5 | 1.2 |
| 1996 | (0.7) | (2.4) | 12.4 | 15.2 | 9.8 | 9.3 | 12.4 | 15.2 | 0.6 |
| 1997 | (3.7) | (21.0) | 8.8 | 12.6 | 13.7 | 8.3 | 8.8 | 12.6 | 0.6 |
| 1998 | (10.2) | (9.0) | 8.7 | 17.4 | 12.6 | 19.1 | 8.7 | 17.4 | 0.6 |
| 1999 | 18.7 | 37.6 | 12.9 | 16.6 | 10.1 | 11.7 | 12.9 | 16.6 | 0.2 |
| 2000 | (15.0) | (27.0) | 14.3 | 17.8 | 0.2 | (5.6) | 14.3 | 17.8 | 0.3 |
| 2001 | (5.7) | (23.1) | 12.0 | 19.5 | 2.5 | (6.4) | 12.0 | 19.5 | 0.2 |
| 2002 | (14.0) | (18.0) | 13.6 | 17.2 | 7.1 | 2.4 | 13.6 | 17.2 | 0.1 |
| 2003 | 12.3 | 25.6 | 15.1 | 19.3 | 17.4 | 28.0 | 15.1 | 19.3 | 0.1 |
| 2004 | 1.3 | 8.5 | 16.2 | 20.6 | 6.4 | 13.0 | 16.2 | 20.6 | 0.1 |
| 2005 | 37.5 | 41.4 | 14.2 | 18.7 | 4.1 | 2.6 | 14.2 | 18.7 | 0.1 |
| 1991-2005 Full Period | (0.3) | (6.9) | 10.6 | 22.6 | 3.4 | 3.9 | 3.5 | 4.8 | 2.0 |
| Sharpe | (0.03) | (0.31) | | | 0.96 | 0.81 | | | |
| Largest Drawdown | 42.0 | 73.9 | | | 7.6 | 11.3 | | | |

*FIG. 18*

| Year | GERMANY | | | | | | | Cash |
|---|---|---|---|---|---|---|---|---|
| | Equity | | | Bonds | | | | |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | (1.8) | 2.7 | 12.2 | 18.8 | 16.2 | 21.6 | 12.2 | 18.8 | 9.8 |
| 1992 | (5.9) | (11.1) | 6.9 | 10.0 | 3.9 | 2.6 | 6.9 | 10.0 | 10.1 |
| 1993 | 24.8 | 37.4 | 5.9 | 10.2 | 14.1 | 19.8 | 5.9 | 10.2 | 7.7 |
| 1994 | (14.3) | (11.1) | 9.1 | 13.0 | 0.8 | 2.4 | 9.1 | 13.0 | 5.6 |
| 1995 | 1.1 | 5.8 | 6.7 | 9.5 | 20.4 | 21.1 | 6.7 | 9.5 | 4.7 |
| 1996 | 21.4 | 27.0 | 12.4 | 15.2 | 9.8 | 9.3 | 12.4 | 15.2 | 3.4 |
| 1997 | 39.5 | 45.9 | 8.8 | 12.6 | 13.7 | 8.3 | 8.8 | 12.6 | 3.4 |
| 1998 | 13.5 | 17.0 | 8.7 | 17.4 | 12.6 | 19.1 | 8.7 | 17.4 | 3.7 |
| 1999 | 25.0 | 38.7 | 12.9 | 16.6 | 10.1 | 11.7 | 12.9 | 16.6 | 3.1 |
| 2000 | (3.2) | (9.2) | 14.3 | 17.8 | 0.2 | (5.6) | 14.3 | 17.8 | 4.5 |
| 2001 | (2.7) | (21.4) | 12.0 | 19.5 | 2.5 | (6.4) | 12.0 | 19.5 | 4.4 |
| 2002 | (14.1) | (44.9) | 13.6 | 17.2 | 7.1 | 2.4 | 13.6 | 17.2 | 3.4 |
| 2003 | 28.1 | 37.6 | 15.1 | 19.3 | 17.4 | 28.0 | 15.1 | 19.3 | 2.4 |
| 2004 | 2.1 | 7.2 | 16.2 | 20.6 | 6.4 | 13.0 | 16.2 | 20.6 | 2.2 |
| 2005 | 20.8 | 27.6 | 14.2 | 18.7 | 4.1 | 2.6 | 14.2 | 18.7 | 2.2 |
| 1991-2005 Full Period | 7.8 | 4.1 | 12.8 | 22.7 | 3.0 | 3.0 | 3.1 | 4.5 | 5.3 |
| Sharpe | 0.61 | 0.18 | | | 0.99 | 0.68 | | | |
| Largest Drawdown | 28.1 | 69.9 | | | 6.4 | 13.1 | | | |

*FIG. 19*

| Year | SWITZERLAND ||||||| |
|---|---|---|---|---|---|---|---|
| | Equity |||| Bonds ||| Cash |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | (0.3) | 11.1 | 12.2 | 18.8 | 16.2 | 21.6 | 12.2 | 18.8 | 8.7 |
| 1992 | 4.8 | 16.4 | 6.9 | 10.0 | 3.9 | 2.6 | 6.9 | 10.0 | 8.3 |
| 1993 | 30.8 | 36.3 | 5.9 | 10.2 | 14.1 | 19.8 | 5.9 | 10.2 | 5.2 |
| 1994 | (8.6) | (13.0) | 9.1 | 13.0 | 0.8 | 2.4 | 9.1 | 13.0 | 4.3 |
| 1995 | 19.3 | 24.0 | 6.7 | 9.5 | 20.4 | 21.1 | 6.7 | 9.5 | 3.1 |
| 1996 | 11.2 | 19.2 | 12.4 | 15.2 | 9.8 | 9.3 | 12.4 | 15.2 | 2.1 |
| 1997 | 48.5 | 58.2 | 8.8 | 12.6 | 13.7 | 8.3 | 8.8 | 12.6 | 1.7 |
| 1998 | 6.7 | 13.9 | 8.7 | 17.4 | 12.6 | 19.1 | 8.7 | 17.4 | 1.6 |
| 1999 | (2.0) | 5.6 | 12.9 | 16.6 | 10.1 | 11.7 | 12.9 | 16.6 | 1.4 |
| 2000 | 1.0 | 6.0 | 14.3 | 17.8 | 0.2 | (5.6) | 14.3 | 17.8 | 3.2 |
| 2001 | (5.5) | (22.5) | 12.0 | 19.5 | 2.5 | (6.4) | 12.0 | 19.5 | 3.0 |
| 2002 | (15.2) | (27.4) | 13.6 | 17.2 | 7.1 | 2.4 | 13.6 | 17.2 | 1.2 |
| 2003 | 16.4 | 20.4 | 15.1 | 19.3 | 17.4 | 28.0 | 15.1 | 19.3 | 0.3 |
| 2004 | 2.6 | 4.9 | 16.2 | 20.6 | 6.4 | 13.0 | 16.2 | 20.6 | 0.5 |
| 2005 | 32.9 | 34.9 | 14.2 | 18.7 | 4.1 | 2.6 | 14.2 | 18.7 | 0.8 |
| 1991-2005 Full Period | 8.3 | 7.7 | 10.7 | 18.2 | 3.3 | 2.8 | 2.5 | 3.7 | 3.6 |
| Sharpe | 0.77 | 0.42 | | | 1.34 | 0.76 | | | |
| Largest Drawdown | 35.8 | 51.9 | | | 4.3 | 10.7 | | | |

*FIG. 20*

| Year | CANADA ||||||| Cash |
|---|---|---|---|---|---|---|---|---|
| | Equity |||| Bonds |||| |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | (2.8) | (1.4) | 12.2 | 18.8 | 16.2 | 21.6 | 12.2 | 18.8 | 9.4 |
| 1992 | (5.0) | (10.7) | 6.9 | 10.0 | 3.9 | 2.6 | 6.9 | 10.0 | 6.8 |
| 1993 | 18.9 | 25.7 | 5.9 | 10.2 | 14.1 | 19.8 | 5.9 | 10.2 | 5.2 |
| 1994 | (5.7) | (5.6) | 9.1 | 13.0 | 0.8 | 2.4 | 9.1 | 13.0 | 5.7 |
| 1995 | 2.3 | 6.5 | 6.7 | 9.5 | 20.4 | 21.1 | 6.7 | 9.5 | 7.4 |
| 1996 | 16.1 | 22.4 | 12.4 | 15.2 | 9.8 | 9.3 | 12.4 | 15.2 | 4.7 |
| 1997 | 3.8 | 10.8 | 8.8 | 12.6 | 13.7 | 8.3 | 8.8 | 12.6 | 3.7 |
| 1998 | (1.4) | (6.7) | 8.7 | 17.4 | 12.6 | 19.1 | 8.7 | 17.4 | 5.3 |
| 1999 | 14.5 | 25.3 | 12.9 | 16.6 | 10.1 | 11.7 | 12.9 | 16.6 | 5.2 |
| 2000 | 6.9 | 1.4 | 14.3 | 17.8 | 0.2 | (5.6) | 14.3 | 17.8 | 5.9 |
| 2001 | (3.1) | (16.1) | 12.0 | 19.5 | 2.5 | (6.4) | 12.0 | 19.5 | 4.2 |
| 2002 | (4.4) | (14.7) | 13.6 | 17.2 | 7.1 | 2.4 | 13.6 | 17.2 | 2.7 |
| 2003 | 18.5 | 22.9 | 15.1 | 19.3 | 17.4 | 28.0 | 15.1 | 19.3 | 3.1 |
| 2004 | 7.3 | 11.8 | 16.2 | 20.6 | 6.4 | 13.0 | 16.2 | 20.6 | 2.4 |
| 2005 | 13.3 | 20.7 | 14.2 | 18.7 | 4.1 | 2.6 | 14.2 | 18.7 | 2.9 |
| 1991-2005 Full Period | 4.9 | 2.8 | 8.7 | 13.9 | 2.7 | 3.9 | 4.3 | 6.1 | 5.9 |
| Sharpe | 0.57 | 0.20 | | | 0.63 | 0.63 | | | |
| Largest Drawdown | 22.4 | 47.6 | | | 8.2 | 16.9 | | | |

*FIG. 21*

| Year | UNITED KINGDOM |||||||| Cash |
|---|---|---|---|---|---|---|---|---|---|
| | Equity |||| Bonds |||| |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | (0.8) | 10.5 | 12.2 | 18.8 | 16.2 | 21.6 | 12.2 | 18.8 | 12.4 |
| 1992 | (0.9) | 5.9 | 6.9 | 10.0 | 3.9 | 2.6 | 6.9 | 10.0 | 10.3 |
| 1993 | 7.5 | 16.6 | 5.9 | 10.2 | 14.1 | 19.8 | 5.9 | 10.2 | 6.3 |
| 1994 | (10.5) | (11.5) | 9.1 | 13.0 | 0.8 | 2.4 | 9.1 | 13.0 | 5.8 |
| 1995 | 10.9 | 16.7 | 6.7 | 9.5 | 20.4 | 21.1 | 6.7 | 9.5 | 7.1 |
| 1996 | 3.5 | 9.9 | 12.4 | 15.2 | 9.8 | 9.3 | 12.4 | 15.2 | 6.4 |
| 1997 | 12.4 | 13.6 | 8.8 | 12.6 | 13.7 | 8.3 | 8.8 | 12.6 | 7.3 |
| 1998 | 8.6 | 8.0 | 8.7 | 17.4 | 12.6 | 19.1 | 8.7 | 17.4 | 7.8 |
| 1999 | 6.4 | 15.2 | 12.9 | 16.6 | 10.1 | 11.7 | 12.9 | 16.6 | 5.8 |
| 2000 | (14.4) | (14.7) | 14.3 | 17.8 | 0.2 | (5.6) | 14.3 | 17.8 | 6.5 |
| 2001 | (6.0) | (18.3) | 12.0 | 19.5 | 2.5 | (6.4) | 12.0 | 19.5 | 5.2 |
| 2002 | (8.7) | (24.4) | 13.6 | 17.2 | 7.1 | 2.4 | 13.6 | 17.2 | 4.2 |
| 2003 | 10.6 | 14.2 | 15.1 | 19.3 | 17.4 | 28.0 | 15.1 | 19.3 | 3.9 |
| 2004 | 1.3 | 6.1 | 16.2 | 20.6 | 6.4 | 13.0 | 16.2 | 20.6 | 4.9 |
| 2005 | 11.0 | 15.5 | 14.2 | 18.7 | 4.1 | 2.6 | 14.2 | 18.7 | 4.9 |
| 1991-2005 Full Period | 1.7 | 1.8 | 8.5 | 17.4 | 1.9 | 2.7 | 4.2 | 6.5 | 7.6 |
| Sharpe | 0.20 | 0.11 | | | 0.45 | 0.42 | | | |
| Largest Drawdown | 30.0 | 52.5 | | | 8.0 | 15.6 | | | |

*FIG. 22*

| Year | AUSTRALIA | | | | | | | Cash |
|---|---|---|---|---|---|---|---|---|
| | Equity | | | Bonds | | | | |
| | AIA Return | ex-Momentum Return | AIA Volatility | ex-Momentum Volatility | AIA Return | ex-Momentum Return | AIA Volatility | ex-Momentum Volatility | 3M LIBOR |
| 1991 | 3.3 | 16.3 | 12.2 | 18.8 | 16.2 | 21.6 | 12.2 | 18.8 | 10.9 |
| 1992 | (4.5) | (12.7) | 6.9 | 10.0 | 3.9 | 2.6 | 6.9 | 10.0 | 6.8 |
| 1993 | 21.9 | 28.2 | 5.9 | 10.2 | 14.1 | 19.8 | 5.9 | 10.2 | 5.4 |
| 1994 | (8.9) | (17.0) | 9.1 | 13.0 | 0.8 | 2.4 | 9.1 | 13.0 | 5.9 |
| 1995 | 1.4 | 7.3 | 6.7 | 9.5 | 20.4 | 21.1 | 6.7 | 9.5 | 8.1 |
| 1996 | (1.0) | 2.1 | 12.4 | 15.2 | 9.8 | 9.3 | 12.4 | 15.2 | 7.5 |
| 1997 | (0.8) | 2.6 | 8.8 | 12.6 | 13.7 | 8.3 | 8.8 | 12.6 | 5.7 |
| 1998 | (1.9) | 0.6 | 8.7 | 17.4 | 12.6 | 19.1 | 8.7 | 17.4 | 5.2 |
| 1999 | 3.8 | 9.1 | 12.9 | 16.6 | 10.1 | 11.7 | 12.9 | 16.6 | 5.2 |
| 2000 | (2.8) | 0.1 | 14.3 | 17.8 | 0.2 | (5.6) | 14.3 | 17.8 | 6.4 |
| 2001 | 0.7 | 6.4 | 12.0 | 19.5 | 2.5 | (6.4) | 12.0 | 19.5 | 5.1 |
| 2002 | (4.5) | (12.1) | 13.6 | 17.2 | 7.1 | 2.4 | 13.6 | 17.2 | 4.9 |
| 2003 | 4.7 | 10.4 | 15.1 | 19.3 | 17.4 | 28.0 | 15.1 | 19.3 | 5.0 |
| 2004 | 19.0 | 22.7 | 16.2 | 20.6 | 6.4 | 13.0 | 16.2 | 20.6 | 5.7 |
| 2005 | 10.9 | 17.1 | 14.2 | 18.7 | 4.1 | 2.6 | 14.2 | 18.7 | 5.8 |
| 1991-2005 Full Period | 2.4 | 1.9 | 7.6 | 12.5 | 2.7 | 3.9 | 5.4 | 7.7 | 7.3 |
| Sharpe | 0.32 | 0.15 | | | 0.50 | 0.51 | | | |
| Largest Drawdown | 21.6 | 25.1 | | | 11.0 | 22.1 | | | |

*FIG. 23*

| | \multicolumn{12}{c}{CURRENCY HEDGE} | | | | | | | | | | | |
|---|---|---|---|---|---|---|---|---|---|---|---|---|
| Year | Yen | | Mark/Euro | | Swiss Franc | | Canadian Dollar | | British Pound | | Australian Dollar | |
| | AIA Return | ex-Momentum Return | AIA Return | ex-Momentum Return | AIA Return | ex-Momentum Return | AIA Return | ex-Momentum Return | AIA Return | ex-Momentum Return | AIA Return | ex-Momentum Return |
| 1991 | 0.1 | 0.1 | 0.0 | 0.0 | (0.0) | (0.1) | 0.0 | 0.0 | 0.0 | 0.0 | 0.0 | 0.1 |
| 1992 | (2.1) | 0.5 | (0.3) | (1.0) | (2.5) | (3.4) | (4.3) | (6.9) | (11.6) | (14.1) | (3.6) | (7.3) |
| 1993 | 8.7 | 11.5 | (5.6) | (3.0) | (3.2) | 0.2 | (1.0) | (1.3) | (3.5) | 0.3 | (2.2) | 0.4 |
| 1994 | 2.1 | 10.0 | 6.6 | 13.8 | 8.7 | 13.7 | (1.3) | (4.8) | 4.7 | 7.6 | 12.1 | 15.2 |
| 1995 | 4.0 | (8.0) | 4.0 | 6.3 | 5.4 | 10.6 | 1.1 | 4.0 | (1.8) | (0.3) | (3.6) | (2.4) |
| 1996 | (3.5) | (15.1) | (4.3) | (8.6) | (4.9) | (16.8) | (1.2) | (0.7) | 8.3 | 10.7 | 6.1 | 9.0 |
| 1997 | (3.4) | (15.8) | (2.9) | (16.5) | (2.1) | (11.9) | (2.0) | (6.4) | (6.0) | (2.8) | (5.2) | (18.2) |
| 1998 | 3.3 | 9.0 | 0.5 | 5.8 | (1.4) | 2.3 | (1.4) | (7.4) | (1.4) | 2.4 | (4.0) | (7.2) |
| 1999 | 1.5 | 5.6 | (4.4) | (15.8) | (4.4) | (16.7) | 1.9 | 5.7 | (2.0) | (2.3) | 1.1 | 7.8 |
| 2000 | (9.0) | (16.3) | 0.0 | (9.2) | (1.5) | (5.4) | (2.2) | (4.4) | (4.3) | (8.0) | (5.5) | (15.4) |
| 2001 | (4.7) | (16.8) | (5.0) | (5.6) | (2.9) | (4.2) | (4.2) | (6.0) | (2.5) | (2.0) | (7.0) | (8.5) |
| 2002 | 5.2 | 8.7 | 15.3 | 19.6 | 13.5 | 19.7 | (1.0) | 1.5 | 10.0 | 13.2 | 7.9 | 12.5 |
| 2003 | 4.4 | 9.0 | 12.8 | 21.0 | 3.5 | 10.4 | 19.8 | 23.8 | 6.4 | 13.7 | 33.0 | 39.2 |
| 2004 | (1.1) | 3.4 | 6.2 | 8.7 | 2.0 | 7.9 | 6.2 | 8.9 | 6.2 | 10.8 | 4.1 | 8.4 |
| 2005 | (5.1) | (15.8) | (8.0) | (13.6) | (8.9) | (15.3) | 0.3 | 2.7 | (7.4) | (8.9) | (4.4) | (4.0) |
| 1991-2005 | | | | | | | | | | | | |
| Full Period | 0.4 | (1.6) | 1.0 | 0.4 | (0.1) | (0.1) | 0.8 | 0.8 | (0.4) | 2.8 | 1.7 | 1.4 |
| Standard Deviation | 6.3 | 11.5 | 6.3 | 10.8 | 6.9 | 11.7 | 3.9 | 6.0 | 5.9 | 9.5 | 5.9 | 10.1 |
| Sharpe | 0.06 | (0.14) | 0.15 | 0.04 | (0.01) | (0.01) | 0.20 | 0.13 | (0.07) | 0.29 | 0.28 | 0.14 |
| Largest Drawdown | 20.9 | 56.1 | 21.1 | 47.7 | 21.6 | 49.4 | 16.1 | 28.0 | 26.7 | 26.0 | 21.6 | 41.3 |

*FIG. 24*

COMMODITY FUTURES INDEX AND METHODS AND SYSTEMS OF TRADING IN FUTURES CONTRACTS THAT MINIMIZE TURNOVER AND TRANSACTIONS COSTS

CROSS REFERENCE TO RELATED APPLICATION

This application is a divisional of U.S. application Ser. No. 11/385,624, filed Mar. 21, 2006, now abandoned which claims priority under 35 U.S.C. 119(e) to U.S. Provisional Application No. 60/663,648, filed Mar. 21, 2005, entitled "Commodity Futures Index And Methods And Systems Of Trading In Futures Contracts That Minimizes Turnover And Transactions Costs," the entirety of which is incorporated herein by reference.

FIELD OF THE INVENTION

The present invention relates to financial services and more particularly to the trading, i.e. buying and selling, of securities and/or commodities. In an embodiment, the present invention provides a Commodity Futures Index. Embodiments of the present invention also provide methods and systems for trading commodity futures contracts.

BACKGROUND OF THE INVENTION

The rate of turnover in a portfolio of futures contracts, and the transaction costs that result from turnover, is a major issue with commodity futures trading and with the various indexes that are representative of futures trading. Turnover in traditional stock and bond indexes such as the Standard and Poor's 500 Index is modest. For that reason, it is relatively inexpensive to replicate this index by holding the underlying stocks.

However, the turnover rate in commodity indexes is very high because futures contracts have a relatively short life and must be frequently replaced. Replacing a futures contract is a two-step process. First, the position that is nearing its maturity date must be closed out, and then a new position must be initiated in a contract that is further from expiration. For this reason, it is much more expensive to replicate a published commodity futures trading strategy or index than a stock index:

As an example, in 2004 the annual turnover rate in the most popular commodity futures index, the Goldman Sachs Commodity Index (GSCI), was 1023%, as measured in round turns (a round turn is a purchase and sale of a commodity futures contract). A portfolio of futures contracts that is designed to track the GSCI generally costs over 1% per year (100 basis points) in transactions costs. By comparison, a portfolio of stocks that tracks the S&P 500 Index can usually be managed for less than 10 basis points per year.

The costs described above are associated with simply holding the index and do not include costs associated with making any additional trades. If the investor desires to hold more or less of a particular stock or commodity futures contract then the costs associated with a given futures index, the transactions and turnover costs are increased further.

BRIEF SUMMARY OF THE INVENTION

The present invention provides financial products that are advantageous for use in the financial services industry and particularly advantageous for use by traders of commodities. In an embodiment, the present invention provides an Index that may be used in the trading of commodity futures.

The present invention also provides methods and systems for trading financial instruments, that are particularly advantageous for commodity trading. Use of an embodiment of a method and/or system of the present advantageously allows a commodity trader active asset allocation while minimizing transaction costs generally associated with active asset allocation. A user of a method and/or system of the present invention has the ability to actively manage a portfolio to maximize return on investment, and/or take advantage of trading opportunities without markedly increasing transaction costs. As a result, a user of a method and/or system of the present invention is placed in a position to make more money from their investments.

In an embodiment, the instant invention allows an investor to employ an active trading strategy using futures contracts that will, within certain boundaries, result in lower transactions than a passive strategy. In an embodiment, the instant invention uses a TMS (Transaction Minimizing Strategy) approach, which fixes the maximum roll quantity (described below) in a given market so that it is within 20% of, typically within 5% of, and in certain embodiments equal to the daily roll quantity (also described below). This differs from other published futures strategies. Other published strategies roll from 20% to 100% of their positions on a particular date, which means that these other strategies tend to be more expensive due to the higher transaction costs relative to the present invention. Accordingly, in an embodiment, the instant invention provides a trading approach that utilizes the innovation of the instant invention as well as methods, computer readable media, and systems for using this innovation.

As set forth above, and in further detail below, embodiments of the present invention relate to methods and systems for reducing transaction costs and minimizing turnover in the trading of futures contracts. In another embodiment, the present invention further provides an algorithm whose output is a method of investing in futures contracts that may reduce the rate of turnover, and thus the cost of trading, of certain common trading strategies.

In an embodiment, a method of the present invention may be applied to a class of strategies referred to as indexing strategies that incorporate a dynamic asset allocation approach using futures contracts.

In an embodiment, the instant invention may reduce the turnover (i.e., the number of transactions) in futures trading thereby reducing the costs of futures trading by employing a unique method of investing in futures contracts. In particular, in an embodiment, the method of the instant invention employs a transactions minimizing strategy (TMS) against indexing strategies and uses a dynamic asset allocation approach using futures contracts.

The transactions minimizing strategy (TMS) of the instant invention can result in lower turnover and lower transactions costs. For example, in comparison to a commodity index such as the GSCI (Goldman Sachs Commodity Index) the TMS may result in total turnover that is up to 30% lower. The resulting cost savings on an investment of $100 million may amount to $300,000 per year or more (e.g., a 30% reduction of 1% transactions costs).

BRIEF DESCRIPTION OF THE SEVERAL VIEWS OF THE DRAWINGS

FIG. 2 is the hypothetical performance statistics for the NCCI (Northhampton Capital Commodity Index) versus the long only index.

FIGS. 4-10 are the hypothetical performance statistics from 1991 until 2004 for a series of commodities in the NCCI and the long only index.

FIG. 11 is a Numerical Example for cattle in August 2004 showing how the NCCI values for total return index and the target allocation are calculated.

FIG. 12 is a Numerical Example for cattle in August 2004 showing how the NCCI values for the actual allocation to each contract, the daily turnover, and the daily return are calculated.

FIG. 14 shows the hypothetical performance of the AIA Global Index versus the Long, Unhedged Index and the MSCI Global Index.

FIG. 16 shows the composite performance for each country allocation using a 50/50 stock/bond allocation.

FIGS. 17-23 are hypothetical performance statistics from 1991 through 2005 for each foreign market.

FIG. 24 shows the return for hedges against each foreign currency.

DETAILED DESCRIPTION OF THE INVENTION

Figure 1:
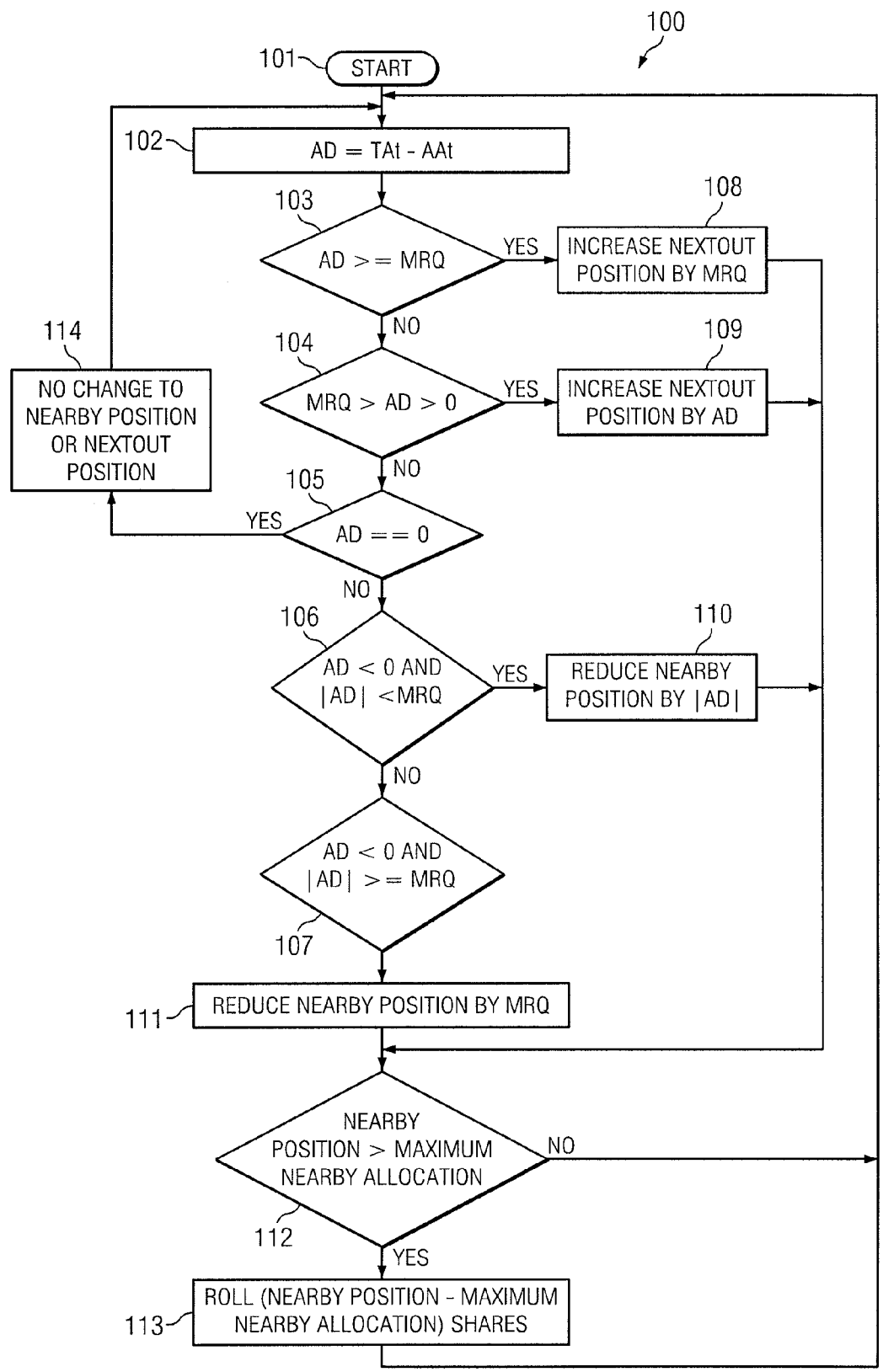
FIG. 1 shows a flowchart of a method in one embodiment of present invention.
Figure 3:
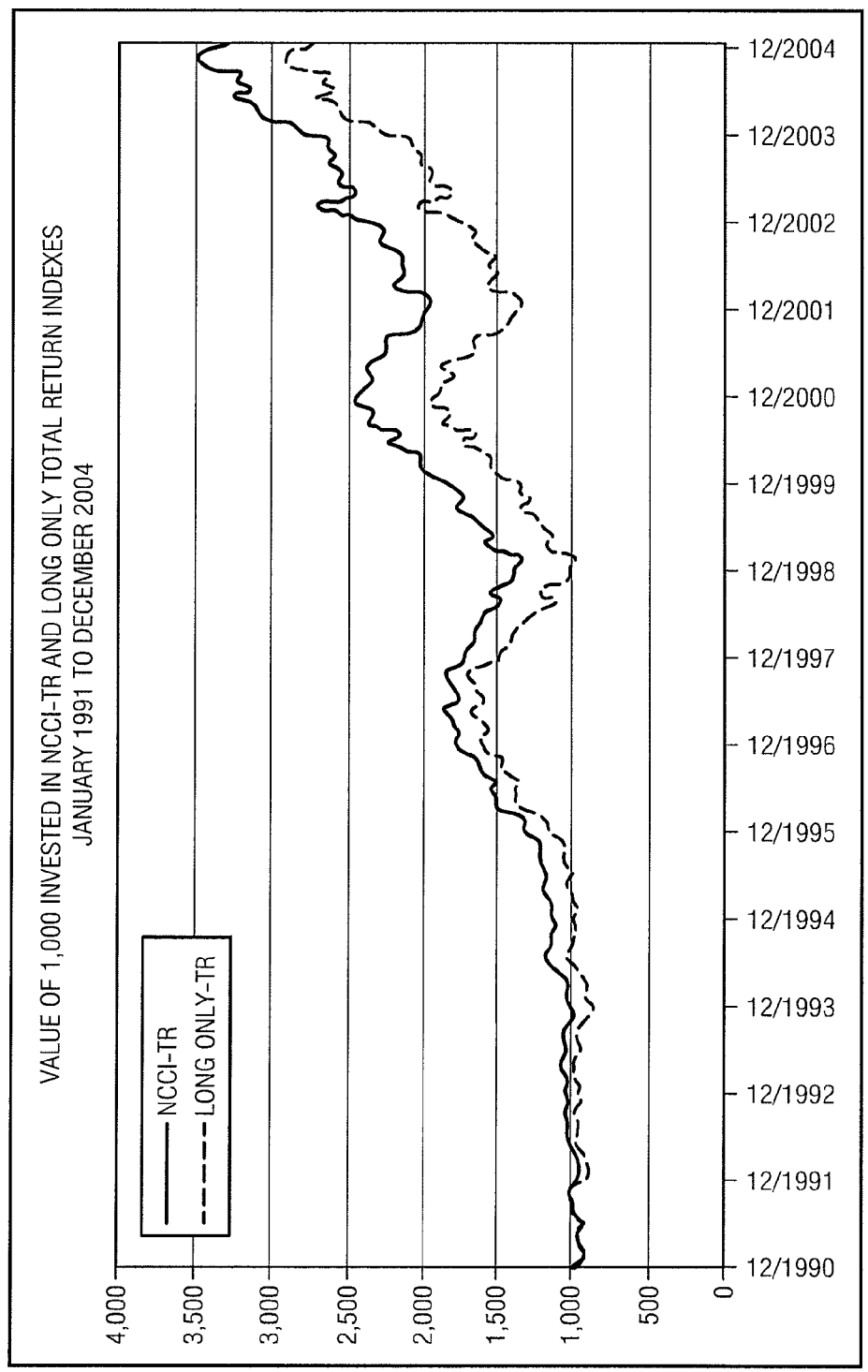
FIG. 3 shows a graph of the value of 1000 invested commodities for the NCCI-TP and long only return indexes from January 1991 to December 2004.
Figure 13:
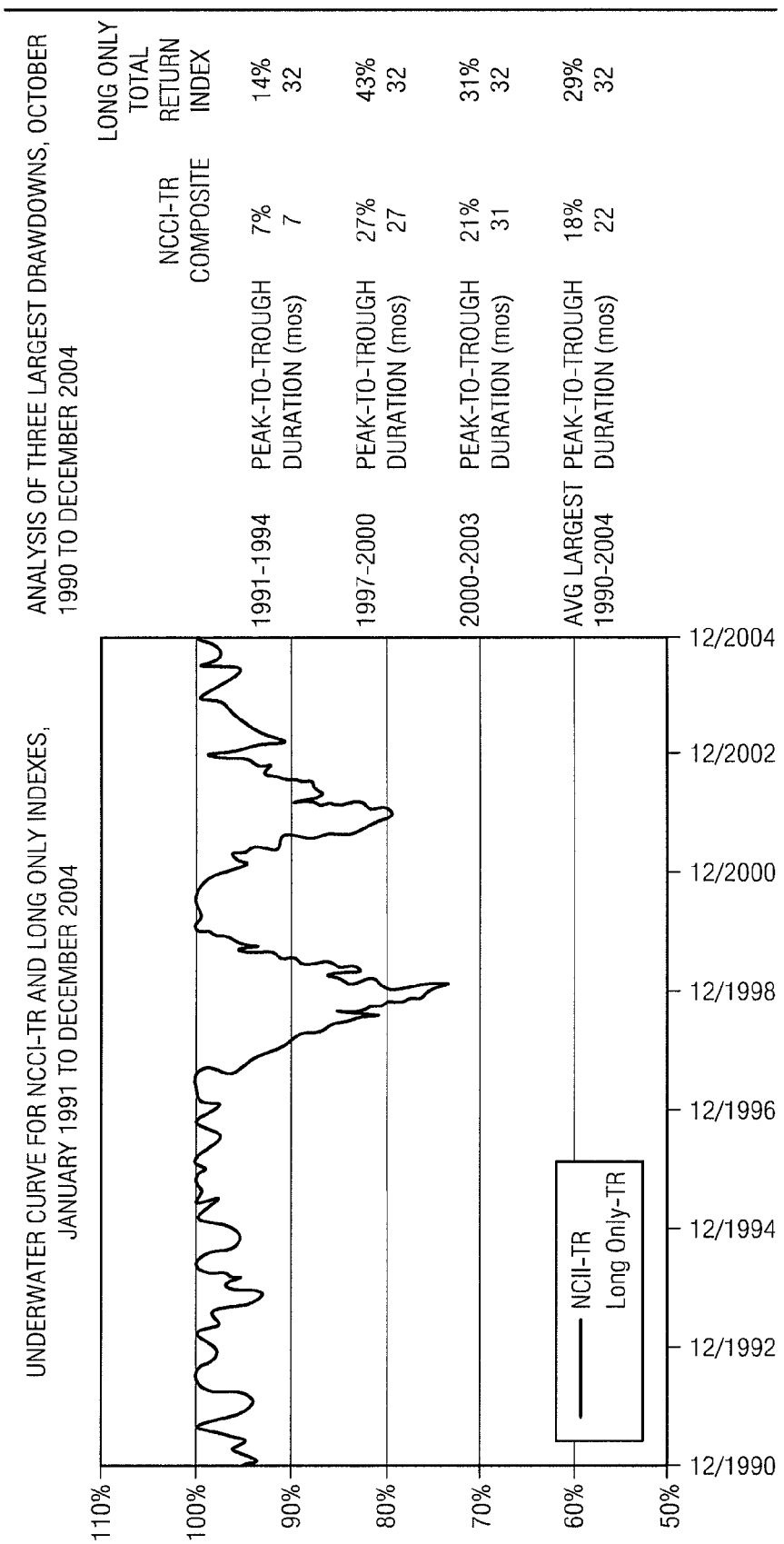
FIG. 13 shows the Underwater Curve for NCCI-TR and Long Only Indexes from January 1991 to December 2004.

In an embodiment, the present invention provides an Index comprising at least one commodity futures contract. Generally, an index of the present invention will comprise a plurality of commodity futures contracts traded accorded to a method of the present invention. As understood by those of ordinary skill in the art, an index, refers to a statistical indicator providing a representation of the value of the commodity futures contracts which constitute it. Indices often serve as barometers for a given market or industry and benchmarks against which financial or economic performance is measured. An index may be used to measure the percent change in return. With respect to commodity futures, a return may comprise one or more of a spot return; a collateral return; and/or a roll return. The terms 'spot return,' 'collateral return,' and 'roll return' are used consistent with their usage by those of skill in the art.

In financial markets, the term commodity is often used to refer to a product which trades on a commodity exchange; including, for example commodities, foreign currencies and financial instruments and indexes. More traditionally, the term commodity generally refers to a physical substance, such as food, grains, and metals, which is interchangeable with another product of the same type, and which investors buy or sell, usually through futures contracts. As the price of the underlying commodity fluctuates due to changes in supply and demand, the return on a corresponding futures contract fluctuates in price based at least in part on the difference between the prices of the futures contract the underlying commodity.

A futures contract generally refers to a standardized, transferable, exchange-traded contract that requires delivery of a commodity, bond, currency, or stock index, at a specified price, on a specified future date. Unlike options, futures convey an obligation to buy. The risk to the holder is unlimited, and because the payoff pattern is symmetrical, the risk to the seller is unlimited as well. Dollars lost and gained by each party on a futures contract are equal and opposite. In other words, futures trading is a zero-sum game. Futures contracts are forward contracts, meaning they represent a pledge to make a certain transaction at a future date. The exchange of assets occurs on the date specified in the contract. Futures are distinguished from generic forward contracts in that they contain standardized terms, trade on a formal exchange, are regulated by overseeing agencies, and are guaranteed by clearinghouses. Also, in order to insure that payment will occur, futures have a margin requirement that must be settled daily. Finally, by making an offsetting trade, taking delivery of goods, or arranging for an exchange of goods, futures contracts can be closed. Hedgers often trade futures for the purpose of keeping price risk in check.

The following terms are used in a manner consistent with their meaning to those of ordinary skill in the art.

Rollover: A futures contract calls for delivery of a commodity at a particular time in the future. An investor in futures contracts does not generally take delivery of the commodity, but rather sells the futures contract as it approaches expiration and buys a new contract for delivery further in the future. This transaction is called a rollover or sometimes simply a roll. An investor can roll an entire futures position or roll a portion of an open position.

Rollover Strategy: A method that describes how a particular portfolio of futures contracts will be rolled.

Nearby Contract: A futures contract that is close to its expiration date. In a rollover strategy, the nearby contract is the position that must be closed out. This position could be a long position or a short position. The sum of nearby contracts for a given commodity is referred to as the nearby position or the nearby allocation.

Nextout Contract: A futures contract with an expiration date further in the future than the nearby contract. In one rollover strategy, the nextout contract is the one the investor will use to initiate a new position, either long or short. The sum of nextout contracts for a given commodity is referred to as the nextout position or the nextout allocation.

Investor: The term 'investor,' as used herein, may refer to one or more individuals, one or more managers of a fund comprising one or more investments, or any other entity or entities that owns, holds or otherwise has an interest in one or more futures contracts.

The following definitions are used in a description of the instant invention.

Last Roll Date: The last date which an investor will hold a position in the nearby contract. After this date any position in the nearby contract must be either rolled or closed out. This value is determined by an investor or by an Index Committee for a given market and will generally be set in a manner that ensures that there will be adequate liquidity remaining in the nearby contract so that positions can be easily liquidated.

Days Between Expirations: The number of days between the last roll date of the prior nearby contract (the contract that has most recently passed its last roll date) and the last roll date of the current nearby contract. An investor or Index Committee may choose to measure this quantity using either the number of calendar days between expirations or the number of business days.

Daily Roll Quantity: The inverse of days between expirations. If this quantity is rolled each trading day, then the entire position will be rolled in equal installments by the last roll date. For example, if there are 62 days between expirations for a given copper futures contract, then if 1/62 (1.613%) of the position is rolled each day the position will be fully rolled on the last roll date of the current nearby copper contract. If calendar days are used to computed the days between expirations, then the daily roll quantity is the inversed of days between expirations times the number of days since the last trading day.

Maximum Roll Quantity: The largest percentage of a futures contract that will be rolled on a given day.

Target Allocation: The target allocation is the number of futures contracts in a given market that a futures trading strategy indicates should be held.

Actual Allocation: The number of futures contracts in a given market that are actually held by an investor utilizing the TMS.

Maximum Nearby Allocation: The largest position that can be held in the nearby contract. This quantity cannot be more than 100% of the total allocation (wherein the total allocation is the maximal allocation that can be held for any one commodity, and must be zero after the last roll date for the nearby contract).

The TMS Methodology:

In an embodiment, the instant invention uses a Transaction Minimizing Strategy (TMS) that fixes the maximum roll quantity in a given market as a multiple of the daily roll quantity. An investor or Index Committee may choose this TMS Multiple to be set to 3, may be set to 2, may be set to 1, or set some fraction between 1 and 3. This differs from other published futures strategies. Because, in an embodiment of the present invention in which the Multiple is equal to 1, the daily roll quantity may not exceed 5% for any of the futures contracts currently traded on major exchanges (because there are no periods of time where the days between expirations is less than 20 days), the maximum roll quantity of an investor using the TMS may not exceed 5% in any market and will often be much less. An additional benefit of this method is a reduction in market impact from rollovers. If a strategy calls for rolling 100% of a position on a particular day, this may have an impact on markets with relatively low liquidity. By limiting the turnover in any contract, the effect of low liquidity will be considerably lessened. Even when the Multiple is set to the maximum value of 3, the largest daily turnover in any contract may not exceed 15% of the position, and will generally be less.

An embodiment of the present invention may employ a maximum nearby allocation (MNA). In one embodiment, the MNA is equal to the product of the daily roll quantity (DRQ) and the number of days until the last roll date (LRD). Such an MNA can insure that an entire nearby position can be rolled on or before the roll date without ever exceeding the daily roll quantity on a given date. In other embodiments of the present invention, the MNA may be set to a value that is different than the product of the DRQ and the LRD. In other embodiments of the present invention, the MNA feature will not be utilized at all. However, if the MNA is eliminated, the MRQ will occasionally exceed the DRQ.

In an embodiment of the present invention 100, as shown in FIG. 1, it may be advantageous to determine a change that should be made in a nearby position and/or a nextout position. For example, in an embodiment of the present invention, it may be advantageous to adjust a nearby position and/or a nextout position based at least in part on an actual allocation of futures contracts and a target allocation of futures contracts.

In some embodiments of the present invention, an allocation difference (AD) can be calculated 101. The allocation difference can be calculated 101 by subtracting the actual allocation from the target allocation. In one such embodiment, the allocation difference may be compared with the maximum roll quantity. The allocation difference may also be compared with 0 to determine whether the allocation difference is positive or negative. In such an embodiment, there are 5 potential states for courses of action that may result from the two comparisons, though only one may be performed:

1. If the allocation difference is greater than or equal to the maximum roll quantity 102, no change is made to the nearby position, and the nextout position is increased 108 by a quantity of nextout contracts that is equal to the maximum roll quantity.
2. If the allocation difference is less than the maximum roll quantity 104 and if the allocation difference is positive 104, no change is made to the nearby position 109, and the nextout position is increased by a quantity of nextout contracts that is equal to the allocation difference 109.
3. If the allocation difference is 0 (105), no change is made to the nearby position or to the nextout position 114.
4. If the allocation difference is negative 106 and the absolute value of the allocation difference is less than the maximum roll quantity 106, the nearby position is reduced 110 by a quantity of nearby contracts equal to the absolute value of the allocation difference.
5. If the allocation difference is negative 107 and the absolute value of the allocation difference is greater than or equal to the maximum roll quantity 107, the nearby position is reduced 111 by a quantity of nearby contracts equal to the absolute value of the maximum roll quantity.

An embodiment of the present invention may further comprise the step where, if there has been a change in the nextout position and/or the nearby position 112, and if the nearby allocation exceeds the maximum nearby allocation 112, then the amount by which the nearby allocation exceeds the maximum nearby allocation is rolled in the usual way 113 (i.e., nearby contracts are sold out of the nearby position and nextout contracts are purchased for the nextout position).

The conditions described above may be summarized as follows. If $\Delta NB$ is defined as the change in the position of the nearby position, $\Delta NX$ is the change in the nextout position, MRQ is the maximum roll quantity, and $AD_t$ is allocation difference at time t, then:

| | | | |
|---|---|---|---|
| Case 1: | $AD_t \geq MRQ$ | $\Delta NB = 0$ | $\Delta NX = MRQ$ |
| Case 2: | $MRQ > AD_t > 0$ | $\Delta NB = 0$ | $\Delta NX = AD_t$ |
| Case 3: | $AD_t == 0$ | $\Delta NB = 0$ | $\Delta NX = 0$ |
| Case 4: | $0 > AD_t$ and $|AD_t| < MRQ$ | $\Delta NB = AD_t$ | $\Delta NX = 0$ |
| Case 5: | $0 > AD_t$ and $|AD_t| \geq MRQ$ | $\Delta NB = -MRQ$ | $\Delta NX = 0$ |

And if a change is made to either the nextout position or the nearby position, and if the nearby allocation is greater than the maximum nearby allocation (NB>MNA), then an additional transaction may bring the nearby allocation to the maximum nearby allocation by rolling NB−MNA shares from the nearby position to the nextout position.

$$\Delta NB = -(NB - MNA)$$

$$\Delta NX = NB - MNA$$

The actions taken in each case have the following effects on the actual allocation:

1. The actual allocation increases but is still less than the target allocation.
2. The actual allocation increases and becomes equal to the target allocation.
3. The actual allocation remains equal to the target allocation.

4. The actual allocation decreases and becomes equal to the target allocation.

5. The actual allocation decreases but is still greater than the target allocation.

These actions summarize the TMS system. By following these rules, in an embodiment of the present invention, the total turnover may not be larger than a system that employs a different rollover strategy and will, in almost every instance, be lower. The turnover may not be higher than the simply rolling a long position because:

1. Using an embodiment of the TMS, one never buys the nearby contract. Once a futures contract becomes the nearby contract, the position may be reduced each day, or left unchanged, but may never be increased.
2. Using an embodiment of the TMS, one never sells the nextout contract. Once a futures contract becomes the nextout contract, the position may be increased each day, or left unchanged, but will never be reduced.

A rollover strategy that breaks up turnover into smaller quantities generally relates to lower transaction costs and lower overall costs. Other embodiments of the present invention may allow an investor to buy a nearby contract or to sell a nextout contract.

Thus, the instant invention is directed to methods of performing the above enumerated steps in trading futures. By following the above-enumerated steps, one is able to reduce the number of transactions, leading to lower transaction costs. The above-enumerated steps can also be part of an algorithm, which in turn can be a computer program or a part of a computer program. Thus, a computer readable media and systems employing the algorithm and/or a computer program are considered to be within the scope of the instant invention. The instant invention contemplates the use of any computer program that comprises one or more of the above steps, wherein such computer program is independent software, may be either web accessible, or is part of a network that may or may not be accessible by the web. Further, it is contemplated that any computer program that performs the above-enumerated steps may be used in concert with any other computer program, whether or not the other computer program is commercially available. Moreover, it is contemplated that any computer program that comprises the above-enumerated steps may be linked to any market or market index that will allow trades or rollover to occur per trader's instruction or to occur automatically.

Thus, the instant invention is directed to methods of performing the above enumerated steps in trading futures. By following the above-enumerated steps, one is able to reduce the number of transactions, leading to lower transaction costs. Further, embodiments of the present invention may be stored as instructions, code or programs on computer-readable media. Systems in communication with such computer-readable media may execute the instructions stored within the computer-readable media to perform the steps described herein as carried out, or assisted, by a processor, computer or server. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, the Internet or through a website, or other transmission device or channel. The processor, and the processing, described may be in one or more structures, and may be dispersed through one or more structures. The processor may be in communication with a market or market index that may allow trades or rollover transactions, wherein such transactions or trades may occur by manual instruction or automatically. The processor may comprise code for carrying out one or more of the methods (or parts of methods) described herein.

In the above steps, it is contemplated that the actual allocation and the target allocation are for any of a number of given individual commodities. Non-limiting examples of commodities include energy such as crude oil (CL), heating oil (HO), gasoline (HU), natural gas (NG), metals such as gold (GC), copper (HG), or aluminum (AL), grains such as corn (C), wheat (W), soybeans (S), livestock such as cattle (LC), lean hogs (LH), softs such as cotton (CT) and coffee (KC), and dairy products such as milk (MJ). However, it will be recognized by those of skill in the art that the instant invention includes allocations of any present day commodities that are actively traded and/or any commodities that may be actively traded in the future including but not limited to futures contacts for delivery of equity indexes, bonds, and foreign exchange.

These commodities can be traded in any market, including but not limited to the American Commodity Exchange, AMEX Commodities Corporation, Chicago Board of Trade, Chicago Mercantile Exchange, Chicago Rice & Cotton Exchange, Coffee, Sugar & Cocoa Exchange, COMEX Division of New York Mercantile Exchange, Kansas City Board of Trade, London Metals Exchange, MidAmerica Commodity Exchange, Minneapolis Grain Exchange, New York Cotton Exchange, New York Futures Exchange, New York Mercantile Exchange, Philadelphia Board of Trade, Pacific Commodity Exchange, Pacific Futures Exchange, Sydney Futures Exchange, Montreal Stock Exchange, Eurex, Osaka Securities Exchange, London International Financial Futures Exchange, Tokyo Stock Exchange, and the Twin Cities Board of Trade.

In general, the approach of the instant invention will result in reduced transactions costs relative to a passive strategy or a very actively traded system as long as the trading system or strategy satisfies two criteria:

1. The system calls for changing the quantities of futures contracts bought or sold short. If the system calls for a constant number of contracts in each market, then the total turnover using the TMS may be the same as with conventional rollover systems.
2. The system does not rely on large changes in the number of futures contracts bought or sold each day. Very active trading systems may not be well suited to the TMS because of the limits placed on the change in allocation to a given commodity.

As long as there is some change in the mix of futures contracts there may be an opportunity to reduce transactions costs using the method, system and/or computer readable media of the instant invention. Opportunity to reduce costs may be maximized for systems that call for moderate changes in different commodity futures contracts each day.

Momentum-Based Trading Rule

An embodiment of the present invention uses a momentum-based trading rule to determine a target allocation for a commodity. Some embodiments of the present invention may use different methods for determining a target allocation for a commodity. Some embodiments of the present invention may use a momentum-based trading rule in combination with one or more other methods, or may not use a momentum-based trading rule at all in determining a target allocation for a commodity. The target allocation can be based on one or more lookback indicators. A lookback indicator according to an embodiment of the present invention may give a positive or a negative signal for a specified period for a commodity. Such a signal may be based at least in part on a difference between a total return index on a first date and second date, wherein the second date occurred one or more days prior the first date. In an embodiment, the signal is positive if the total return index on the second date is less than the total return index on the first date, otherwise the signal is negative. Such a signal is called a lookback indicator because it looks back one or more days, but ignores dates in between the first and second dates. In an embodiment of the present invention, one or more lookback indicators may be used to compute a target allocation.

In an embodiment of the present invention, a total return index for a date may be calculated before evaluating one or more lookback indicators. In an embodiment, a total return index may be calculated using the following steps: calculating a proportion of an investment held in a nearby contract on a first date ($P_t$), calculating a spot index ($S_t$), calculating a one-day spot profit/loss ($SpotPL_t$), calculating roll profit/loss ($rollPL_t$), calculating a total profit/loss ($totalPL_t$), calculating a daily return ($r_t$), and calculating the total return index ($TRI_t$).

In an embodiment, $P_t$ may be calculated by dividing the number of days until a last roll date of a nearby contract by the number of days between last roll dates of a prior expiration and a nearby expiration, as shown in the following equation:

$$P_1 = \frac{\text{\# days until last roll date of nearby contract}}{\text{\# days between last roll dates of prior expiration and nearby expiration}}$$

In an embodiment, the spot index, St, may be calculated as follows, where NB is the price of a nearby contract, NX is the price of a nextout contract, and 1−Pt is the proportion of an investment held in a nextout contract:

$$S_t = (NB)P_t + NX^*(1-P_t)$$

In an embodiment, the 1-day spot profit/loss maybe calculated as follows, where $S_{t-1}$ is the spot index for the date preceding the date for which the total return index is calculated.

$$SpotPL_t = S_t - S_{t-1}$$

In an embodiment, the roll profit/loss may be calculated as follows, where $P_{t-1}$ is the proportion of the investment held in nearby contracts for the date preceding the date for which the total return index is calculated. In an embodiment, the roll profit/loss may reflect the portion of the contract rolled each day.

$$RollPL_t = (NX-NB)^*(P_{t-1}-P_t)$$

In an embodiment, the total profit/loss may be set equal to the spot profit/loss plus the roll profit/loss as shown:

$$TotalPL_t = SpotPL_t + rollPL_t$$

In an embodiment, the daily return may be calculated as the percentage gain or loss based on the prior day's total investment, $$r_t = TotalPL_t / S_{t-1}$$

In an embodiment, the total return index may be computed from the daily returns.

$$TRI_t = TRI_{t-1}(1+r_1)$$

In an embodiment, a lookback indicator for a first date, t, and a second date, t-x, may have a positive signal if the total return index for date t ($TRI_t$) is greater than the total return index for date t-x ($TRI_{t-x}$). In an embodiment, a lookback indicator, $L_x$, may have a value of 1, if $TRI_t > TRI_{t-x}$, and a value of 0 otherwise.

An embodiment of the present invention may employ one or more lookback indicators to determine a target allocation. For example, in an embodiment, a target allocation may be based on three lookback indicators according to the following equation, wherein $L_{15}$ is a lookback indicator for a date 15 days preceding the present date, $L_{27}$ is a lookback indicator for a date 27 days preceding the present date, and $L_{55}$ is a lookback indicator for a date 55 days preceding the present date.

$$TA_t = [L_{15} + L_{27} + L_{55}]^*100\%]/3$$

In another embodiment, a target allocation may be based on three lookback indicators according to the following equation, wherein 40% is the minimum percentage allocation for the target allocation.

$$TA_t = 40\% + 20\%^*(L_{15} + L_{27} + L_{55})$$

A more general equation for determining a target allocation based upon one or more evenly-weighted lookback indicators may be expressed as follows, wherein $TA_{min}\%$ is the minimum percentage for the total allocation, n is the number of lookback parameters to be used, and $L_1$ through $L_n$ are the lookback parameters to be used (n.b. the subscripts, 1 and n, used here denote a series of lookback parameters, rather than dates related to the lookback parameters), and wherein $100\% \geq X\% \geq TA_{min}\% \geq 0\%$.

$$TA_t = TA_{min}\% + \frac{X\% - TA_{min}\%}{n} * (L_1 + \ldots + L_n)$$

For example, let $TA_{min}=40\%$, X %=100%, n=3, and L={$L_{15}$, $L_{27}$, $L_{55}$}, as used previously.

$$TA_t = 40\% + \frac{100\% - 40\%}{3} * (L_{15} + L_{27} + L_{55})$$

which becomes, as shown previously:

$$TA_t = 40\% + 20\%^*(L_{15} + L_{27} + L_{55})$$

An embodiment of the present invention may determine a target allocation based at least in part on one or more unevenly weighted lookback parameters. For example, a total allocation may be based on three lookback parameters with uneven weights.

$$TA_t = 40\% + [(10\%^*L_{15}) + (20\%^*L_{27}) + (30\%^*L_{55})]$$

In such an embodiment, $L_{15}$ has the least weight, $L_{27}$ has twice the weight of $L_{15}$, and $L_{55}$ has triple the weight of $L_{15}$.

Still other embodiments may comprise more or fewer lookback parameters, different weights, or a different minimum percentage allocation. A more general expression of a target allocation equation using unevenly weighted parameters is shown below, wherein W % is a weighting percentage; $n \geq 1$; p denotes one of a set of lookback parameters, wherein the set of lookback parameters comprises one or more lookback parameters; and $100\% \geq X\% \geq 0\%$.

$$TA_t = TA_{min}\% + \sum_{p=1}^{n}(W_p\% * L_p)$$

where $$TA_{min}\% + \sum_{p=1}^{n}(W_p\%) = X\%$$

For example, let $TA_{min}$=40%, X%=100%, n=3, W={10%, 20%, 30%) and L={$L_{15}$, $L_{27}$, $L_{55}$}.

$$TA_t = 40\% + \sum_{p=1}^{3}(W_p\% * L_p)$$

which reduces to, as shown above:

$$TA_t = 40\% + [(10\% * L_{15}) + (20\% * L_{27}) + (30\% * L_{55})]$$

and $$TA_{min} = 40\% + \sum_{p=1}^{3}(W_p\%)$$

which reduces to $TA_{min}$=40%+(10%+20%+30%)=100%

The following examples illustrate how the above-mentioned method, system and computer readable media are employed in one embodiment of the instant invention. These examples are merely meant as illustrations of the instant invention and in no way are meant to limit the scope of the instant invention. Those of skill in the art will recognize that the method is a general method that can be employed with a variety of known trading systems and/or markets with the below listed commodities or with other commodities. Additional minor modifications that fit within the spirit of the instant invention are considered to be within the scope of the instant invention such as other commodities and other methods of determining target allocations, etc.

An Application of Transactions Minimizing System to a Commodity Futures Index: The Northampton Capital Management LLC Strategy and Index:

Example of how the Transaction Minimizing Strategy Works:

Generally, the TMS is employed using a given commodities index by applying the following generic steps:

An Index Committee selects the contracts to be traded and selects the Maximum Allocation to a given commodity or sector.

An index is selected that trades a given number of commodity futures index. Thus, it will be understood by those of skill in the art that the above method is a general method that can be used with any of a variety of indexes.

A publicly available momentum-based trading rule determines the Target Allocation for each commodity. However, those of skill will recognize that there are many publicly available trading rules. Thus, the methods, systems and computer readable media of the instant invention is adaptable to work with any of these trading rules.

Employs the Transactions Minimizing System to determine the Actual Allocation to a given commodity.

As an illustration of how the TMS works, the NCCI (Northhampton Capital Commodity Index) is used. This Index has been used for trading either 13 or 14 commodity futures contracts. Thus, those of skill in the art will recognize that any number of commodities can be traded and it will be recognized that the mix of commodities can be changed so that other commodities are traded. However, in this illustrative example, the following table (Table 1) shows the futures contracts that have been selected to be components of the index. The allocations to each commodity and the contract months traded are also provided. There is the assumption that allocations will be made on an unleveraged basis and based on market prices for the various contracts at the time of investment. This implies a re-allocation of risk each day due to the daily roll methodology employed in the index. The maximum allocation is the largest percentage of assets invested in a given commodity. Because of the momentum-based asset allocation rule, the actual allocation could be less than the maximum allocation.

TABLE 1

| Market | Exchange | Maximum Allocation | Expiration Months |
|---|---|---|---|
| Coffee | NYBOT | 5% | March, May, July, September, December |
| Copper | COMEX | 10% | March, May, July, September, December |
| Corn | CBOT | 5% | March, May, July, September, December |
| Cotton | NYBOT | 5% | March, May, July, October, December |
| Crude Oil | NYMEX | 20% | All months |
| Gold | COMEX | 5% | February, April, June, August, December |
| Heating Oil | NYMEX | 10% | All months |
| Lean Hogs | CME | 5% | February, April, June, July, August, October, December |
| Live Cattle | CME | 5% | February, April, June, July, August, October, December |
| Natural Gas | NYMEX | 10% | All months |
| Soybeans | CBOT | 5% | January, March, May, July, November |
| Unleaded Gasoline | NYMEX | 10% | All months |
| Wheat | CBOT | 5% | March, May, July, September, December |

The NCCI (Northhampton Capital Commodity Index) is rebalanced daily. The allocation to each futures market is based on the spot index (equation (2) below). In one embodiment of the instant invention, the weights are determined by the Index Committee and changes in weights are announced by June 30 of any year for implementation on January 1 of the following year.

In another embodiment, a different mix (of 14 commodities) may be used, including the following areas of trade and commodities that fall into these areas (with the respective maximal percentages being recited in the parentheses):

ENERGY (50%): Crude Oil (20), Heating Oil (10), Gasoline (10), Natural Gas (10).

METALS (15%): Gold (5), Copper (5), Aluminum (5).

GRAINS (15%): Corn (5), Wheat (5), Soybeans (5).

LIVESTOCK (10%): Live Cattle (5), Lean Hogs (5)

SOFTS (10%): Cotton (5), Coffee (5)

The below table (Table 2) displays the exchange where these individual commodities can be found as well as the expiration months. Still other embodiments may use different mixes of futures contracts.

TABLE 2

| MARKET | EXCHANGE | EXPIRATION MONTHS |
|---|---|---|
| Aluminum | LME | All months |
| Coffee | CSCE | March, May, July, September, December |
| Copper | COMEX | March, May, July, September, December |
| Corn | CBOT | March, May, July, September, December |
| Cotton | NYCE | March, May, July, December |
| Crude Oil | NYMEX | All months |
| Gold | COMEX | February, April, June, August, December |
| Heating Oil | NYMEX | All months |
| Lean Hogs | CME | February, April, June, July, August, October, December |
| Live Cattle | CME | February, April, June, July, August, October, December |
| Natural Gas | NYMEX | All months |
| Soybeans | CBOT | January, March, May, July, November |
| Unleaded Gasoline | NYMEX | All months |
| Wheat | CBOT | March, May, July, September, December |

The NCCI utilizes a momentum-based trading rule to determine the target allocation to a given commodity. To minimize turnover and trading costs, there may be a maximum daily position change in each commodity, so that the actual allocation to a given commodity may be higher or lower than the target allocation if the target allocation changes by more than this daily maximum turnover.

Determining the Target Allocation by Employing the Momentum-Based Trading Rule

The target allocation is based on the momentum-based trading rule described in Spurgin (Spurgin, R., A Benchmark for Commodity Trading Advisor Performance, The Journal of Alternative Investments, Fall, 1999), which is herein incorporated in its entirety, and as described above. However, it will be understood by those of skill in the art that a target allocation can be derived from many of the publicly available trading rules. In an embodiment of the present invention, a momentum-based trading rule evaluates three signals for each commodity; a short term signal, a medium term signal, and a long term signal. Each signal can be positive or negative. Based on these signals and a minimum target allocation of 40%, the target allocation takes on one of four possible values: 40%, 60%, 80%, and 100% of the maximum allocation. Thus, the position in each commodity will never be more than 100% or less than 40%. For example, corn is given a 5% maximum allocation, so the target allocation for corn as a percentage of the total value of the index can be 2% (i.e., 40% of the maximum allocation), 3% (i.e., 60% of the maximum allocation), 4% (i.e., 80% of the maximum allocation), or 5% (i.e., 100% of the maximum allocation).

In one embodiment, the target allocation can be determined by means of a lookback strategy.

The target allocations in the NCCI are based on the lookback strategy described above. An x-day lookback strategy gives a positive signal if the total return index on date t is higher than it was on date t-x. Otherwise, the strategy gives a negative signal.

The number of days used to compute the lookback indicators in the NCCI are 15 days for the short-term ($L_{15}$), 27 days for the medium-term ($L_{27}$), and 55 days for the long-term ($L_{55}$) momentum-based trading strategy.

The total return index may be computed before the lookback signals can be evaluated. Note that this total return index may only be used to evaluate trading signals and generate the target allocation. It may not actually traded in the index. This may be because the total return index may be based on a full long position in the underlying commodity futures contract and uses a slightly different rollover strategy than the traded portion of the NCCI. The NCCI total return index for each commodity may be a weighted average of the return of the position in both the nearby and the nextout contracts. The NCCI uses a continuous roll strategy. It holds positions in the two nearest active futures contracts, and each day sells some of the front contract and rolls the position into the next-out contract.

In an embodiment, the roll strategy incorporated in the total return index may be linear—if there are 90 days between the last roll dates of the nearby and nextout contract, then $\frac{1}{90}$ of the position will be rolled each day ($\frac{3}{90}$ will be rolled over the weekend). Rollovers will be based on calendar day with weekend/holiday rolls taking place on the day after the weekend/holiday. This strategy may be employed in order to provide the smoothest possible return series from which to generate a trend-following system. Other embodiments may comprise non-linear or other total return indexes. Mathematically, the strategy can be summarized as described above in the "Momentum-Based Trading Rule" section.

Computing the Trading Rule

In an embodiment, the lookback trading rule for a given number of days 4 will take on a positive value if the total return is positive between date t-x and date t. In this illustrative example, if $TRI_t > TRI_{t-x}$, then $L_x = 1$, otherwise $L_x = 0$. Other embodiments may comprise trading rules that have positive values based on other or additional considerations.

The NCCI evaluates three lookback signals to determine the target allocation: $L_{15}$, $L_{27}$, and $L_{55}$. The minimum target allocation is 40% long, and this is increased by 20% for each positive signal:

$$TA_1 = 40\% + 20\% * (L_{15} + L_{27} + L_{55})$$

Thus, if all of the look-back signals ($L_{15}$, $L_{27}$, and $L_{55}$) give positive returns the target allocation will be 100%. For corn, the target allocation would be 5% (or 100% of 5%). Changes in the NCCI trading rule are implemented with a 1-day lag, which may reduce ambiguity.

A quicker way of evaluating the signal may be to look for the Number of Positive Signals Target Allocation as % of Maximum Allocation:

If none of the signals (i.e., $L_{15}$, $L_{27}$ and $L_{55}$) are positive than the target allocation is approximately 40% of maximum, in an embodiment. In other embodiments, the target allocation may be greater or less than approximately 40% of maximum.

If one of the signals is positive, then the target allocation is approximately 60% of maximum, in an embodiment.

If two of the signals are positive, then the target allocation is approximately 80% of maximum, in an embodiment.

If all three of the signals are positive, then the target allocation is approximately 100% of maximum, in an embodiment.

In an embodiment, if a commodity futures contract has a zero long-run rate of return, then the average target allocation may be 70%, as each signal will have a 50% chance of being positive on any given day. In other words, each signal ($L_{15}$, $L_{27}$ and $L_{55}$) contributes 50%

$$TA_1 = 40\% + 20\% * (L_{15} = \frac{1}{2} + L_{27} = \frac{1}{2} + L_{55} = \frac{1}{2}) = 70\%$$

Given the positive long-run rate of return observed in commodity futures markets as a result of inflation and positive roll returns due to backwardation, it is likely that the long-run probability of a positive signal will be higher than 50% and the average target allocation above 70%. In other embodiments, the average target allocation may be less than 70%, or may comprise a different lookback strategy or parameters.

Using historical data from 1991 to 2004, the average target allocation in a given commodity ranged from a low of 64.6% in coffee to a high of 74.8% in crude oil.

The average target allocation data derived from historical data can likely be used advantageously to decide what futures contracts to hold and in what amounts. Thus, the instant invention can advantageously be used to further increase profits. In other words, the futures that perform well are given a higher target allocation and are thus, held in higher amounts. In contrast, the commodity futures that perform less well may be held in lower amounts, or alternatively, can be used in a decision to not hold the commodity at all when the index is being set. The average target allocation data derived from historical data can aid in this decision.

Determining the Actual Allocation and the Position Changes Each Trading Day.

The Transactions Minimizing Strategy (TMS) incorporates many of the features of the daily rollover strategy described above, but with modifications to allow for dynamic asset allocation based on the trading rule while still minimizing transactions costs. The basic insight may be the connection between the rollover strategy and the asset allocation strategy. The daily rollover strategy involves selling a small portion of the position in the nearby contract each day and buying a similar quantity of the deferred contract (i.e., the nextout contract). However, if the intent is to reduce the overall exposure to the contract, this can be accomplished by selling a small portion of the nearby contract as planned, but not buying the deferred (i.e., nextout) contract. The result is a lower overall allocation. Similarly, increasing the allocation can be accomplished by slightly increasing the position in the deferred contract but not selling the front contract. Thus, within certain boundaries, active asset allocation can be accomplished without increasing the transactions costs.

The hypothetical annual performance of the NCCI for the years 1991 to 2004 is shown in the table (Table 3) below. For comparison purposes, the returns to a Long-Only index and a Target Allocation index are provided. The NCCI Long-Only index shows the hypothetical performance of the NCCI without the dynamic asset allocation strategy (i.e., it does not apply the lookback strategy and assumes a target allocation of 100% throughout for each commodity). As such, the difference between the NCCI and the NCP Long-Only indexes reflects the performance of the asset allocation strategy. The other comparison index, called the Target Allocation Index assumes that the actual allocation is moved to the target allocation each trading day. The difference between the NCCI return and the Target Allocation return reflects the performance of the Transactions Minimizing System as described above.

TABLE 3

NCCI Composite Pro Forma

| Returns 1991-2004 | NCCI Return | Long Only Return | Target Allocation Return |
|---|---|---|---|
| 1991 | (3.5) | (10.8) | (5.5) |
| 1992 | 8.2 | 7.2 | 7.6 |
| 1993 | (3.4) | (10.0) | (3.4) |
| 1994 | 14.7 | 15.7 | 14.0 |
| 1995 | 16.0 | 17.1 | 16.2 |
| 1996 | 32.8 | 38.4 | 31.6 |
| 1997 | (3.9) | (7.7) | (0.8) |
| 1998 | (17.6) | (31.3) | (17.1) |
| 1999 | 28.7 | 34.7 | 29.9 |
| 2000 | 32.3 | 37.9 | 34.5 |
| 2001 | (18.3) | (28.0) | (17.6) |

TABLE 3-continued

NCCI Composite Pro Forma

| Returns 1991-2004 | NCCI Return | Long Only Return | Target Allocation Return |
|---|---|---|---|
| 2002 | 21.0 | 29.9 | 22.8 |
| 2003 | 17.6 | 27.5 | 20.3 |
| 2004 | 18.0 | 18.6 | 16.4 |
| Average Annual Return | 10.2 | 10.0 | 10.6 |
| Compound Annual Return | 8.9 | 7.3 | 9.3 |
| Annualized Standard Deviation | 11.2 | 14.9 | 11.2 |
| Sharpe Ratio | 0.41 | 0.21 | 0.44 |

The performance table indicates that the NCCI average annual return (10.2%) is about the same as the Long Only return (10.0%), but the compound return of the NCCI (8.9%) may be substantially higher than the compound return of the Long Only index (7.3%). Furthermore, the annualized volatility of the NCCI (11.2) may be significantly lower than the volatility of the Long Only index (14.9%). The higher return and lower volatility result in a Sharpe Ratio for the NCCI of 0.41, about twice as large as the Sharpe Ratio of the Long Only index.

When compared to the Target Allocation index, the NCCI has an annual return that is a about a half-percent lower than the Target Allocation index and almost the same volatility. However, the annual turnover for the Target Allocation index is more than 50% higher than the NCCI, so it is likely that the additional trading costs would compensate for the higher returns of the Target Allocation index.

The low correlation between commodity index products and other major asset classes may make them an attractive diversifier (such as trading currencies in the financial markets). As shown below in Table 4, despite the active asset allocation feature embedded in the NCCI, the correlation with other commodity indexes is very high and the correlation with other asset classes is quite low. The correlations between the NCCI and other major commodity indexes are above 93% and are only slightly less than the corresponding correlations with the Long Only index. The correlation between the NCCI and U.S. stock and bond markets are both close to zero. The NCCI also has a low correlation (0.17) with an index of large commodity trading advisors. The low correlation between the NCCI and other large commodity trading advisors is due to the fact that most of these trading advisors trade primarily in financial and currency markets, so they would not be expected to have a high correlation with an index that trades primarily in physical commodity markets (as is present in the current embodiment of the NCCI).

TABLE 4

Correlation with Asset Classes and Commodity Indexes

| Major Commodity Indexes | NCCI Correlation | Long Only Index Correlation |
|---|---|---|
| Goldman Sachs Commodity Index | .94 | .95 |
| Dow Jones/AIG Commodity Index | .93 | .94 |
| Lehman U.S. Aggregate | .01 | .01 |
| S&P 500 Total Return Index | .03 | .06 |
| CISDM CTA Dollar-Weight Index | .17 | .11 |
| (Source: Bloomberg LP) | | |

In Table 3 above, it was shown that the compound return of the Long Only Index (7.3%) was significantly lower than the average annual return (10.0%). In contrast, the NCCI has a compound return (8.9%) that is significantly closer to the average annual return (10.2%). That is because the NCCI is designed to have lower losses during drawdowns. These lower losses can be seen in FIG. 12, which shows the Underwater Curve for NCCI-TR and Long Only Indexes from January 1991 to December 2004. In Table 5, an analysis of the three largest drawdowns in the period from October 1990 to December 2004 is shown.

TABLE 5

Analysis of Three Largest Drawdowns, October 1990 to December 2004

|  | NCCI-TR Composite | Long Only Total Return Index |
|---|---|---|
| 1991-1994 Peak-to-Trough | 7% | 14% |
| Duration (months) | 7 | 32 |
| 1997-2000 Peak-to-Trough | 27% | 43% |
| Duration (months) | 27 | 32 |
| 2000-2003 Peak-to-Trough | 21% | 31% |
| Duration (months) | 31 | 32 |
| 1990-2004 Peak-to-Trough | 18% | 29% |
| Duration (months) | 22 | 32 |

One of the principal benefits of a dynamic asset allocation strategy is its ability to reduce exposure to an investment asset during a sustained decline. The momentum-based trading rule incorporated in the NCCI is similar to a portfolio insurance strategy. During the sizeable declines in commodity prices in 1998 and 2001, the NCCI reduced its average position to below 60% of assets, allowing for significantly reduced losses during those periods. As shown in table 5 above, the NCCI experienced a peak-to-trough decline of 27% during the 1997-2000 bear market in commodity prices, while the Long Only index experienced a 43% peak-to-trough decline. The subsequent decline that bottomed out in 2001 saw an 18% decline for the NCCI and a 29% decline for the Long Only index. Over the 1991-2004 time period analyzed, NCCI drawdowns were about ⅓ less severe and about ⅓ shorter on average than drawdowns in the Long Only index. Thus, it may be advantageous to not have large allocations of commodities in periods where they are suffering drawdowns.

Average turnover in the NCCI Composite averages about 30% less than the Long Only index. Using the TMS methodology, the NCCI turns over about 6.4 times per year versus 9.0 times for the Long Only index. While estimates of transactions costs in commodity markets vary considerably, it is common for investors to pay in excess of 100 basis points per year for a long-only commodity index product, so a reduction of 30% in costs can mean substantial savings. Furthermore, because the NCCI trades a little each day rather rolling the entire position on a few days each roll period, there is less impact on liquidity. This can result in substantial savings by employing the NCCI.

The following table (Table 6) outlines the turnover rates for the NCCI Composite, the Long Only index and the Target Allocation index. The turnover rate for the Target Allocation index uses some of the TMS methodology (daily rolls, incorporates roll strategy into asset allocation strategy) but does not use the maximum daily quantity. If the Target Allocation increases by 20% at the end of a trading day, the full 20% will be traded rather than spreading the trade over several days as would be the case in the NCCI. The total turnover in the Target Allocation index is a bit lower than the Long Only index (8.6 turns per year versus 9.0 turns for the Long Only index) but is still considerably higher than the NCCI (in all instances). These additional transaction costs are likely to make both the Target Allocation index and the Long Only index considerably more expensive than the NCCI.

TABLE 6

NCCI Composite Turnover Analysis

|  | NCCI Turnover | Long Only Turnover | Target Allocation Turnover |
|---|---|---|---|
| 1991 | 6.2 | 9.0 | 8.5 |
| 1992 | 6.4 | 9.0 | 8.2 |
| 1993 | 5.9 | 9.0 | 8.0 |
| 1994 | 6.4 | 9.0 | 8.7 |
| 1995 | 6.8 | 9.0 | 8.9 |
| 1996 | 7.3 | 9.0 | 9.4 |
| 1997 | 6.1 | 9.0 | 7.9 |
| 1998 | 4.9 | 9.0 | 7.0 |
| 1999 | 6.9 | 9.0 | 8.8 |
| 2000 | 7.1 | 9.0 | 9.0 |
| 2001 | 5.3 | 9.0 | 7.9 |
| 2002 | 7.0 | 9.0 | 9.2 |
| 2003 | 6.8 | 9.0 | 8.8 |
| 2004 | 7.1 | 9.0 | 9.4 |
| Average Annual Turnover | 6.4 | 9.0 | 8.6 |

This invention describes the methodology for constructing the Northampton Capital Commodity Index (NCCI). The index uses active asset allocation to reduce the risks inherent in a commodity product while preserving the beneficial return and correlation properties that have made commodities an attractive investment alternative. The technology employed in the construction of the index ensures that transactions costs are minimized, while performance of the NCCI is comparable to or superior to the other indexes. Liquidity is maintained by combining rolls and asset allocation decisions and by trading small quantities of each commodity each day. Products linked to this index may be attractive to investors with concerns about the high costs of maintaining an investment in other commodity indexes or with concerns about the large drawdowns that long-only commodity indexes have experienced over the past decade.

The Index

The method, system or algorithm employing the Northampton Capital Management Commodity Index provides investors with a platform to generate high returns when commodity prices are rising, moderate losses when commodity prices are declining, and total transactions costs that are about 70% of the cost associated with commodity index products that do not employ the TMS and do not employ a dynamic trading rule. The returns may be comparable to or superior to other trading methods yet do not suffer the drawback of increased transaction costs present in other trading systems.

An Application of Transactions Minimizing System to a Global Asset Allocation Index: The AIA Global Strategy and Index:

Generally, the TMS is employed using a given commodities index by applying the following generic steps:

An Index Committee selects the contracts to be traded and selects the Maximum Allocation to a given commodity or sector.

An index is selected that trades a given number of commodity futures index. Thus, it will be understood by those of skill in the art that the above method is a general method that can be used with any of a variety of indexes.

A publicly available momentum-based trading rule determines the Target Allocation for each commodity. However, those of skill will recognize that there are many publicly available trading rules. Thus, the methods, systems and computer readable media of the instant invention is adaptable to work with any of these trading rules.

Employs the Transactions Minimizing System to determine the Actual Allocation to a given commodity.

As a further illustration of how the TMS works, the AIA Global Index is used. The AIA Global Index comprises an allocation of assets across a plurality of markets. This illustrative embodiment comprises markets in Australia, Canada, Japan, Switzerland, the United Kingdom, the United States, and the European Union. Other embodiments may comprise more or fewer markets, or may comprise some, all, or none of the markets used in this illustrative example. Within each selected market, one or more representative indexes is selected. Since futures markets are highly liquid, transparent, and tightly regulated, the Index may be assumed to hold all investment assets through futures markets. In the illustrative embodiment, the representative indexes are selected based upon two factors, while other embodiments may use fewer or more factors and/or different factors:

1. Liquidity: There should be sufficient volume and open interest in order to support substantial investment.
2. Representative: For equity markets, the index should be broadly representative of the local equity market and the economic region.

In this illustrative embodiment, the following futures contracts have been selected to be components of the index. The allocations to each commodity and the contract months traded are also provided. The maximum allocation is the largest percentage of assets invested in a given market. Because of the momentum-based asset allocation rule, the actual allocation could be less than this.

TABLE 7

| COUNTRY/TYPE | INDEX | EX-CHANGE | ALLO-CATION % |
|---|---|---|---|
| AUSTRALIA Equity | SPI 200 | SFE | 2.5 |
| CANADA Equity | SP/TSE 60 | MSE | 2.5 |
| EURO Equity | BUND 10YR | EUREX | 10.0 |
| JAPAN Equity | NIKKEI 225 | OSE | 10.0 |
| SWISS Equity | SMI | EUREX | 2.5 |
| UK Equity | FTSE 100 | LIFFE | 2.5 |
| US Equity | SP500 | CME | 20.0 |
| Total Equity | | | 50.0 |
| AUSTRALIA Bond | AUST 10YR | SFE | 2.5 |
| CANADA Bond | CAN 10YR | MSE | 2.5 |
| EURO Bond | DAX | EUREX | 20.0 |
| JAPAN Bond | JPN 10YR | TSE | 20.0 |
| SWISS Bond | SWISS FED BD | EUREX | 2.5 |
| UK Bond | LONG GILT | LIFFE | 2.5 |
| US Bond | TSY 10YR | CBT | 20.0 |
| Total Bond | | | 50.0 |
| AUSTRALIA Currency | AUSTRALIAN DOLLAR | CME | −5.0 |
| CANADA Currency | CANADIAN DOLLAR | CME | −5.0 |
| EURO Currency | EURO CURRENCY | CME | −20.0 |
| JAPAN Currency | YEN | CME | −20.0 |
| SWISS Currency | SWISS FRANC | CME | −5.0 |
| UK Currency | BRITISH POUND | CME | −5.0 |
| Total Currency* | | | −60.0 |

*Currency weights reflect the maximum hedge position, which will never exceed the allocation to debt and equity for a given country.

The AIA Global Index is rebalanced daily. The allocation to each futures market is based on the spot index (equation (2) below). In one embodiment of the instant invention, the weights are determined by the Index Committee and changes in weights may be announced prior to implementation on January 1 of the following year.

The illustrative example of the AIA Global Index utilizes a momentum-based trading rule to determine the target allocation to a given commodity. To minimize turnover and trading costs, there may be a maximum daily position change in each commodity, so that the actual allocation to a given commodity may be higher or lower than the target allocation if the target allocation changes by more than this daily maximum turnover.

Determining the Target Allocation by Employing the Momentum-Based Trading Rule

The target allocation is based on the momentum-based trading rule described in Spurgin (Spurgin, R., A Benchmark for Commodity Trading Advisor Performance, The Journal of Alternative Investments, Fall, 1999), which is herein incorporated in its entirety. However, it will be understood by those of skill in the art that a target allocation can be derived from many of the publicly available trading rules. In an embodiment using a momentum-based trading rule, three signals may be evaluated for each commodity; a short term signal, a medium term signal, and a long term signal. Each signal can be positive or negative. In an embodiment, based on these signals, the target allocation may takes on one of four possible values: 0%, 33.3%, 66.7%, and 100% of the maximum allocation. Thus, the position in each commodity will never be more than 100% or less than 0%. For example, in an embodiment, Japan is given a 20% maximum allocation, so the target allocation for Japan as a percentage of the total value of the index can be 0% (i.e., 0% of the maximum allocation), 6.66% (i.e., 33.3% of the maximum allocation), 13.33% (i.e., 66.7% of the maximum allocation), or 20% (i.e., 100% of the maximum allocation).

In one embodiment, the target allocation can be determined by means of a lookback strategy.

The target allocations in the NCCI are based on the lookback strategy described above. An x-day lookback strategy gives a positive signal if the total return index on date t is higher than it was on date t-x. Otherwise, the strategy gives a negative signal.

The number of days used to compute the lookback indicators in the AIA Global Index are 15 days for the short-term ($L_{15}$), 27 days for the medium-term ($L_{27}$) and 55 days for the long-term ($L_{55}$) momentum-based trading strategy.

The total return index may be computed before the lookback signals can be evaluated. Note that this total return index may not be used only to evaluate trading signals and generate the target allocation. It may not be actually traded in the index. This may be because the total return index may be based on a full long position in the underlying commodity futures contract and uses a slightly different rollover strategy than the traded portion of the AIA Global Index. The AIA Global Index total return index for each commodity may be a weighted average of the return of the position in both the nearby and the nextout contracts. The AIA Global Index may use a continuous roll strategy. It may hold positions in the two nearest active futures contracts, and each day may sell some of the front contract and may roll the position into the next-out contract.

The roll strategy incorporated in the total return index may be linear—if there are 90 days between the last roll dates of the nearby and nextout contract, then 1/90 of the position will be rolled each day (3/90 will be rolled over the weekend). Rollovers will be based on calendar day with weekend/holiday rolls taking place on the day after the weekend/holiday. This strategy may be employed in order to provide the smoothest possible return series from which to generate a trend-following system. In other embodiments, the strategy may be non-linear. Mathematically, the strategy can be summarized using steps described above in the "Momentum-Based Trading Rule" section.

Computing the Trading Rule

In an embodiment, the lookback trading rule for a given number of days $L_x$ takes on a positive value if the total return is positive between date t-x and date t. If $TRI_t > TRI_{t-x}$ then $L_x=1$, otherwise $L_x=0$. In other embodiments, a lookback trading rule may take on a positive value based on different or additional criteria.

The AIA Global Index may evaluate three lookback signals to determine the target allocation; $L_{15}$, $L_{27}$, and $L_{55}$. The minimum target allocation is approximately 0% long, and this may be increased by 33.3% for each positive signal:

$$TA_1 = [(L_{15} + L_{27} + L_{55}) * 100\%]/3$$

Thus, if all of the look-back signals ($L_{15}$, $L_{27}$, and $L_{55}$) give positive returns the target allocation may be 100%. For Japan, the target allocation would be 20% (or 100% of 20%). Changes in the AIA Global Index trading rule are implemented with a 1-day lag, which may reduce ambiguity.

Hypothetical Return Performance for AIA Global Index for 1991-2005

FIG. 14 shows the comparison of the return of the AIA Global Index to an index that holds the same index futures contracts as the AIA Global Index but is always fully long and does no currency hedging. The AIA Global Index return (9.1%) is slightly lower than a simple buy-and-hold strategy return (9.5%). Furthermore, the average annualized volatility of the AIA Global Index (4.5%) is lower than the volatility of the Long Unhedged index (7.9%). The lower volatility results in a Sharpe Ratio for the AIA Global Index of 0.91 as compared to the 0.57 Sharpe Ratio of the Long Unhedged index.

The MSCI Global Composite Index, which was launched in 2001, is a global stock and bond index that does not hedge currency risk. The weights and assets are similar to the AIA Global Index. The MSCI index gives a higher weight to North America (50% for MSCI, 45% for AIA Global Index, larger equity exposure (55% for MSCI, 50% for AIA Global Index) and shorter duration bonds (approximately 40% lower duration in the MSCI index). Despite these differences, the Long Unhedged Index has returns that are very close to the MSCI Global Index for the 2001-2005 period. The dynamic asset allocation model in the AIA Global Index allows for returns that are of similar magnitude to fixed-weight indexes with roughly half the volatility.

Drawdown Analysis

Figure 15:
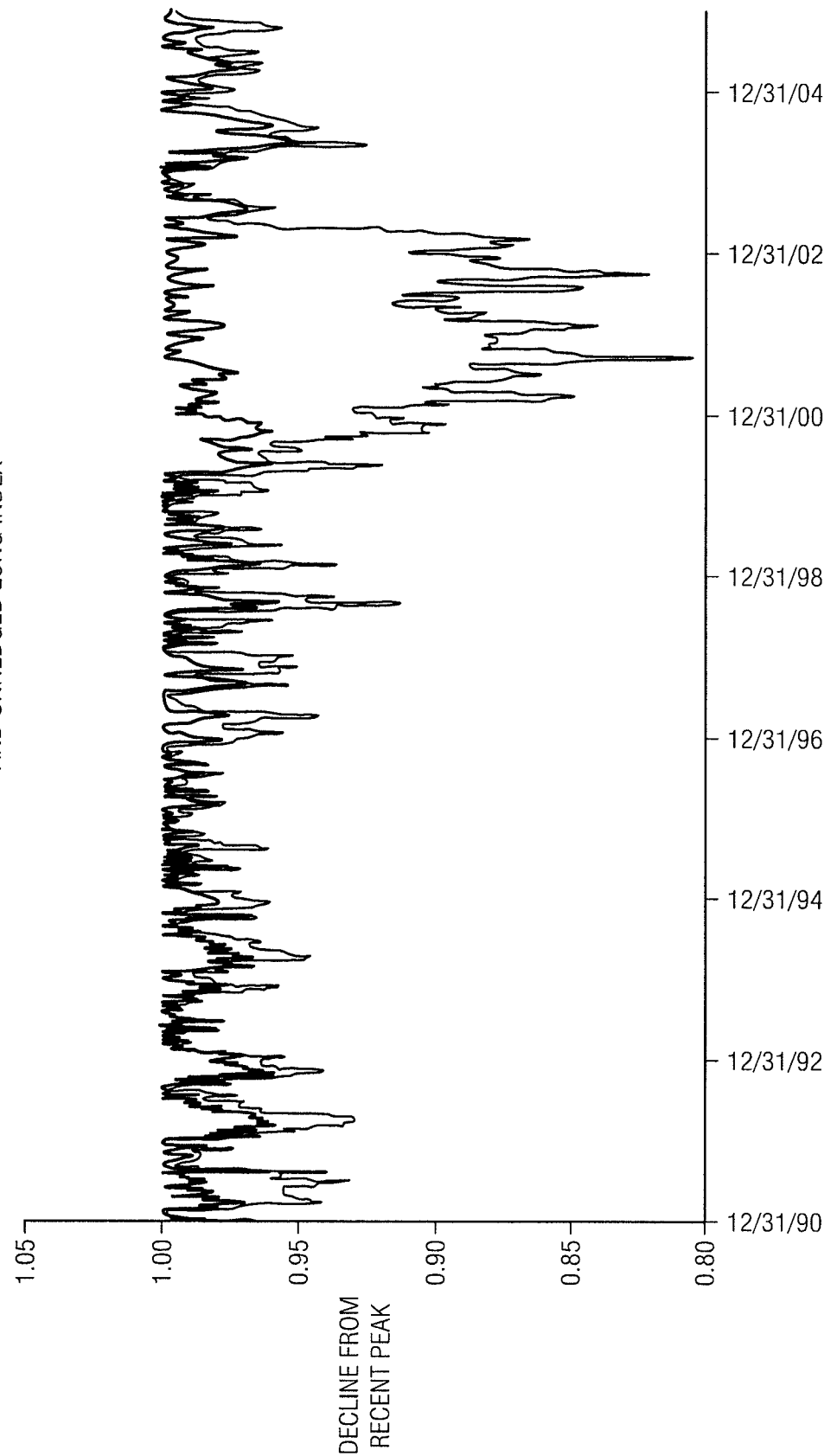
FIG. 15 shows the Underwater Curve for the AIA Global Index and Unhedged Long Indexes from Dec. 31, 1990 through Dec. 31, 2004.

One of the major impediments to investment in commodity indexes is their propensity for large drawdowns. FIG. 15 charts the drawdowns of the AIA Global Index and the Long Only Index.

One of the principal benefits of a dynamic asset allocation strategy may be its ability to reduce exposure to an investment asset during a sustained decline. The momentum trading rule incorporated in the AIA Global Index is similar to a portfolio insurance strategy. During the sizeable declines in commodity prices in 2000 to 2002, the AIA Global Index reduced its average position to below 60% of assets, allowing for significantly reduced losses during those periods. As shown in the table above, the AIA Global Index experienced a peak-to-trough decline of less than 5% during the 2000-2002 bear market in global equity prices, while the Long Only index experienced a 19% peak-to-trough decline.

Those of skill in the art will recognize that the above disclosed invention is a general method and system that is used for futures trading. The method and/or system can employ many different components such as a series of different allocations of commodities, a series of different means of calculating target allocations, a series of different indexes, and other components. Thus, it should be recognized by those of skill in the art that these modifications are within the spirit and scope of the instant invention. and that the invention is not to be limited by the foregoing illustrative details, but rather is to be defined by the appended claims. Moreover, it is contemplated and within the scope of the instant invention that any limitation from any claim can be used in combination with any one or more limitation from any other claim.

This provisional application contains the appendixes A and B, which are herein incorporated in their entirety by reference. Appendix A is entitled "The Northampton Capital Commodity Index: A Guide To Index Methodology And Construction" (27 pages) and Appendix B is a Power Point presentation entitled "The Northampton Capital Partners Commodity Index Fund" (35 pages). The references recited herein are incorporated by reference in their entirety.

Anson, M., "Spot returns, Roll Yield, and Diversification with Commodity Futures," The Journal of Alternative Investments, December 1998.

Becker, K., and J. Finnerty, "Indexed Commodity Futures and the Risk and Return of Institutional Portfolios", OFOR Working Paper, 2000.

Fama, Eugene and Kenneth French, "Business Cycles and The Behavior of Metals Prices," Journal of Finance, Vol. 43, no. 5, December 1988.

Greer, R. J., "Conservative Commodities: A Key Inflation Hedge," The Journal of Portfolio Management, Summer 1978.

Greer, Robert J. "Methods for Institutional Investment in Commodity Futures," The Journal of Derivatives, Winter 1994, pp. 28-36

Halpern, P. and R. Warsager., "The Performance of Energy and Non-Energy Based Commodity Investment Vehicles in Periods of Inflation," The Journal of Alternative Investments, Summer 1998, pp. 75-81.

Schneeweis, T. and R. Spurgin, "Comparisons of Commodity and Managed Futures Benchmark Indexes," The Journal of Derivatives, Summer 1997, pp. 33-50.

Spurgin, R., "A Benchmark for Commodity Trading Advisor Performance," *The Journal of Alternative Investments*, Fall, 1999

Strongin, S., and M. Petsch, "Commodity Investing: Long-Run Returns and the Function of Passive Capital," Derivatives Quarterly, Fall 1995, pp. 56-64.

That which is claimed is:

1. A method of reducing transaction costs in trading futures contracts comprising employing a system that uses an algorithm wherein said algorithm performs the following steps:

determining an allocation difference by subtracting an actual allocation from a target allocation, wherein the target allocation is a number of futures contracts in a futures market that a futures trading strategy indicates should be held, and wherein the actual allocation comprises:

a nearby position comprising a number of nearby contracts in the futures market, each nearby contract having a first expiration date; and a nextout position comprising a number of nextout contracts in the futures market, each nextout contract having an expiration date later than the expiration date of each nearby contract;

comparing the allocation difference to a maximum roll quantity; and using one or more computers, adjusting the actual allocation based at least in part on the comparison.

2. The method according to claim 1, wherein:
the allocation difference is greater than or equal to the maximum roll quantity; and
adjusting the actual allocation comprises increasing the nextout position by a quantity of nextout contracts that is equal to the maximum roll quantity.

3. The method according to claim 1, wherein:
the allocation difference is positive and less than the maximum roll quantity; and
adjusting the actual allocation comprises increasing the nextout position by a quantity of nextout contracts that is equal to the allocation difference.

4. The method according to claim 1, wherein:
the allocation difference is negative and the absolute value of the allocation difference is less than the maximum roll quantity; and
adjusting the actual allocation comprises decreasing the nearby position by a quantity of nearby contracts equal to the absolute value of the allocation difference.

5. The method according to claim 1, wherein:
the allocation difference is negative and the absolute value of the allocation difference is greater than or equal to the maximum roll quantity; and
adjusting the actual allocation comprises decreasing the nearby position by a quantity of nearby contracts equal to the maximum roll quantity.

6. The method according to claim 1, further teaches comprising:
decreasing the nearby position by a quantity of nearby contracts equal to the maximum roll quantity; and
increasing the nextout position by a quantity of nextout contracts equal to the maximum roll quantity.

7. The method according to claim 1, wherein:
the days between expirations (DBE) is the number of days between the expiration date of a prior nearby contract and the expiration date of a current nearby contract; and
the days between expirations (DBE) is calculated as one of business days and calendar days.

8. The method according to claim 1, wherein the expiration date of each nearby contract in the nearby position is the last date upon which each nearby contract in the nearby position may be rolled over.

9. The method according to claim 1 further comprising:
determining a maximum nearby allocation;
determining whether the number of nearby contracts in the nearby position exceeds the maximum nearby allocation; and
in response to the determination that the number of nearby contracts in the nearby position exceeds the maximum nearby allocation, rolling the nearby position by the amount by which the nearby position exceeds the maximum nearby allocation.

10. The method according to claim 1, wherein the system is accessible through a web site.

11. The method according to claim 1, wherein the futures trading strategy varies the target allocation for commodities.

12. The method according to claim 1, wherein the futures trading strategy is based at least in part on one or more of the NCCI and the AIA Global Index.

13. The method according to claim 1, wherein the target allocation is determined at least in part by a momentum-based trading rule.

14. The method according to claim 1, wherein the maximum roll quantity is calculated according to the equation:

$$MRQ = (x/BDE)$$

where
MRQ=maximum roll quantity;
x=a number in the range between 1 and 3 inclusive; and
DBE=days between expirations.

15. A system for reducing transaction costs in trading futures contracts, the system comprising:
one or more processors;
one or more non-transitory computer-readable media;
logic embodied in the one or more non-transitory computer-readable media and operable, when executed by the one or more processors, to:
determine an allocation difference by subtracting an actual allocation from a target allocation, wherein the target allocation is a number of futures contracts in a futures market that a futures trading strategy indicates should be held, and wherein the actual allocation comprises:
a nearby position comprising a number of nearby contracts in the futures market, each nearby contract having a first expiration date; and
a nextout position comprising a number of nextout contracts in the futures market, each nextout contract having an expiration date later than the expiration date of each nearby contract;
compare the allocation difference to a maximum roll quantity; and adjust the actual allocation based at least in part on the comparison.

16. The system according to claim 15, wherein:
the allocation difference is greater than or equal to the maximum roll quantity; and
the logic is further operable, when executed by the one or more processors, to adjust the actual allocation by increasing the nextout position by a quantity of nextout contracts that is equal to the maximum roll quantity.

17. The system according to claim 15, wherein:
the allocation difference is positive and less than the maximum roll quantity; and
the logic is further operable, when executed by the one or more processors, to adjust the actual allocation by increasing the nextout position by a quantity of nextout contracts that is equal to the allocation difference.

18. The system according to claim 15, wherein:
the allocation difference is negative and the absolute value of the allocation difference is less than the maximum roll quantity; and
the logic is further operable, when executed by the one or more processors, to adjust the actual allocation by decreasing the nearby position by a quantity of nearby contracts equal to the absolute value of the allocation difference.

19. The system according to claim 15, wherein:
the allocation difference is negative and the absolute value of the allocation difference is greater than or equal to the maximum roll quantity; and
the logic is further operable, when executed by the one or more processors, to adjust the actual allocation by decreasing the nearby position by a quantity of nearby contracts equal to the maximum roll quantity.

20. The system according to claim 15, wherein the logic is further operable, when executed by the one or more processors, to adjust the actual allocation by: decreasing the nearby position by a quantity of nearby contracts equal to the maximum roll quantity; and
increasing the nextout position by a quantity of nextout contracts equal to the maximum roll quantity.

21. The system according to claim 15, wherein:
the days between expirations (DBE) is the number of days between the expiration date of a prior nearby contract and the expiration date of a current nearby contract; and
the days between expirations (DBE) is calculated as one of business days and calendar days.

22. The system according to claim 15, wherein the expiration date of each nearby contract in the nearby position is the last date upon which each nearby contract in the nearby position may be rolled over.

23. The system according to claim 15, wherein the logic is further operable, when executed by the one or more processors, to:
determine a maximum nearby allocation;
determine whether the number of nearby contracts in the nearby position exceeds the maximum nearby allocation; and
in response to the determination that the number of nearby contracts in the nearby position exceeds the maximum nearby allocation, roll the nearby position by the amount by which the nearby position exceeds the maximum nearby allocation.

24. The system according to claim 15, wherein the system is accessible through a web site.

25. The system according to claim 15, wherein the futures trading strategy varies the target allocation for commodities.

26. The system according to claim 15, wherein the futures trading strategy is based at least in part on one or more of the NCCI and the A1A Global Index.

27. The system according to claim 15, wherein the target allocation is determined at least in part by a momentum-based trading rule.

28. The system according to claim 15, wherein the maximum roll quantity is calculated according to the equation:

$$MRQ = (x/BDE)$$

where
MRQ=maximum roll quantity;
x=a number in the range between 1 and 3 inclusive; and
DBE=days between expirations.

* * * * *

UNITED STATES PATENT AND TRADEMARK OFFICE
CERTIFICATE OF CORRECTION

PATENT NO. : 8,447,694 B2
APPLICATION NO. : 12/613356
DATED : May 21, 2013
INVENTOR(S) : Richard B. Spurgin et al.

It is certified that error appears in the above-identified patent and that said Letters Patent is hereby corrected as shown below:

In the Claims

Column 23, Line 28, After "The method according to claim 1, further", please delete "teaches".

Column 23, Line 67, After "MRQ=(x/", please delete "BDE", please insert -- DBE --.

Column 26, Line 14 approx., After "MRQ=(x/", please delete "BDE", please insert -- DBE --.

Signed and Sealed this
Ninth Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,447,694 B2 | Page 1 of 1 |
| APPLICATION NO. | : 12/613356 | |
| DATED | : May 21, 2013 | |
| INVENTOR(S) | : Spurgin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this
Eleventh Day of November, 2014

Michelle K. Lee
*Deputy Director of the United States Patent and Trademark Office*